US010339890B2

(12) United States Patent
Morita

(10) Patent No.: US 10,339,890 B2
(45) **Date of Patent: *Jul. 2, 2019**

(54) DRIVER AND ELECTRONIC DEVICE

(71) Applicant: SEIKO EPSON CORPORATION, Tokyo (JP)

(72) Inventor: Akira Morita, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/941,451

(22) Filed: Mar. 30, 2018

(65) Prior Publication Data

US 2018/0226047 A1 Aug. 9, 2018

Related U.S. Application Data

(62) Division of application No. 14/925,319, filed on Oct. 28, 2015, now Pat. No. 9,966,031.

(30) Foreign Application Priority Data

Nov. 7, 2014 (JP) ................................ 2014-226884

(51) Int. Cl.

*G06F 3/038* (2013.01)
*G09G 5/00* (2006.01)
*G09G 3/36* (2006.01)

(52) U.S. Cl.

CPC ......... *G09G 3/3696* (2013.01); *G09G 3/3688* (2013.01); *G09G 2310/027* (2013.01);
(Continued)

(58) Field of Classification Search

CPC ..... G09G 2310/0248; G09G 2310/027; G09G 2310/08; G09G 2320/0223; G09G 3/3688; G09G 3/3696

See application file for complete search history.

(56) References Cited

U.S. PATENT DOCUMENTS 6,420,988 B1 7/2002 Azami et al.
6,486,812 B1 11/2002 Tanaka
(Continued)

FOREIGN PATENT DOCUMENTS

JP H05-145421 A 6/1993
JP 2000-165243 A 6/2000
(Continued)

OTHER PUBLICATIONS

Mar. 10, 2017 Office Action issued in U.S. Appl. No. 14/925,319.
(Continued)

*Primary Examiner* — Insa Sadio
(74) *Attorney, Agent, or Firm* — Oliff PLC

(57) ABSTRACT

A display device having a driver that drives load lines in an electro-optical panel through capacitor charge redistribution is provided with a first driving capacitance circuit that drives the load lines, and a second driving capacitance circuit that drives output of a D/A conversion circuit for outputting a voltage corresponding to a driving voltage. Settling time of the output of the D/A conversion circuit is shortened by controlling the second driving capacitance circuit to set the output of the D/A conversion circuit to a desired output voltage.

19 Claims, 21 Drawing Sheets

(52) U.S. Cl.
CPC . *G09G 2310/0248* (2013.01); *G09G 2310/08* (2013.01); *G09G 2320/0223* (2013.01)

(56) References Cited

U.S. PATENT DOCUMENTS

| | | | | |
|---|---|---|---|---|
| 6,549,196 | B1 | 4/2003 | Taguchi et al. | |
| 2004/0227749 | A1 | 11/2004 | Kimura | |
| 2005/0168416 | A1* | 8/2005 | Hashimoto .......... | G09G 3/3233 345/76 |
| 2005/0206598 | A1* | 9/2005 | Yamazaki ............ | G09G 3/3648 345/87 |
| 2008/0165179 | A1 | 7/2008 | Ayres | |
| 2012/0025876 | A1 | 2/2012 | Kimura | |
| 2013/0099832 | A1 | 4/2013 | Kimura | |

FOREIGN PATENT DOCUMENTS

| | | | |
|---|---|---|---|
| JP | 2000-341125 | A | 12/2000 |
| JP | 2001-156641 | A | 6/2001 |
| JP | 2004-252419 | A | 9/2004 |
| JP | 2008-533513 | A | 8/2008 |
| WO | 2006092755 | A2 | 9/2006 |

OTHER PUBLICATIONS

Sep. 7, 2017 Office Action issued in U.S. Appl. No. 14/925,319.
Jan. 11, 2018 Notice of Allowance issued in U.S. Appl. No. 14/925,319.

* cited by examiner

FIG. 9A RESET
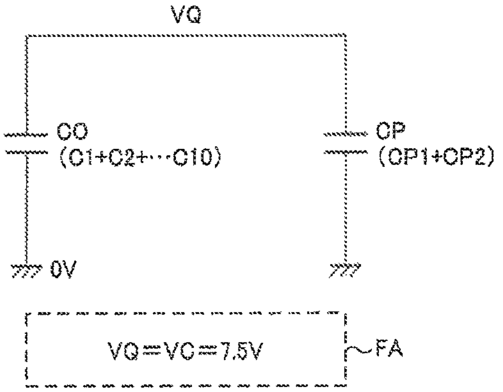
FIG. 9B MAXIMUM DATA VOLTAGE
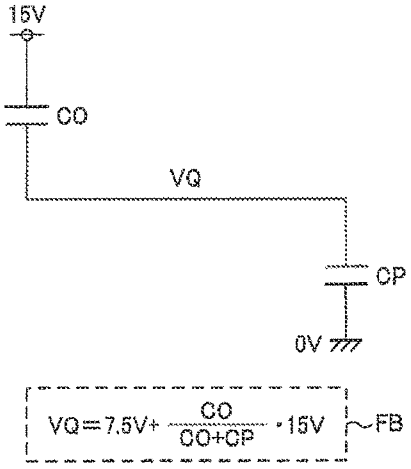
FIG. 9C
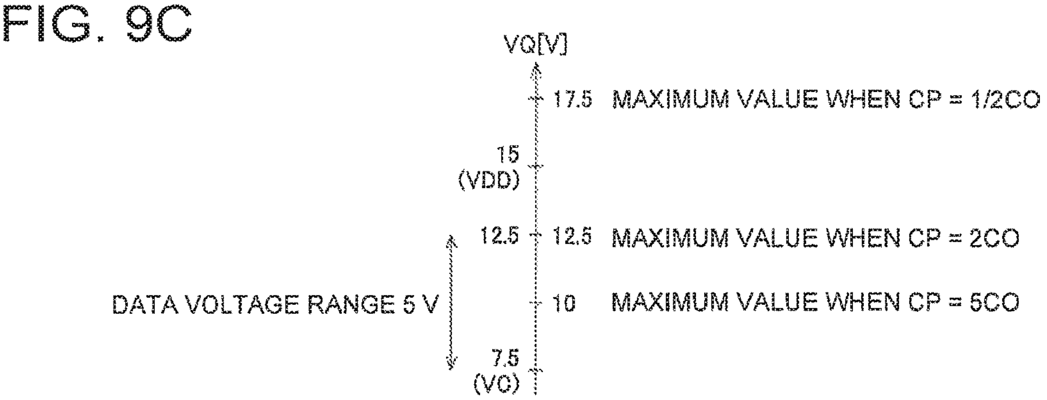

FIG. 11A RESET
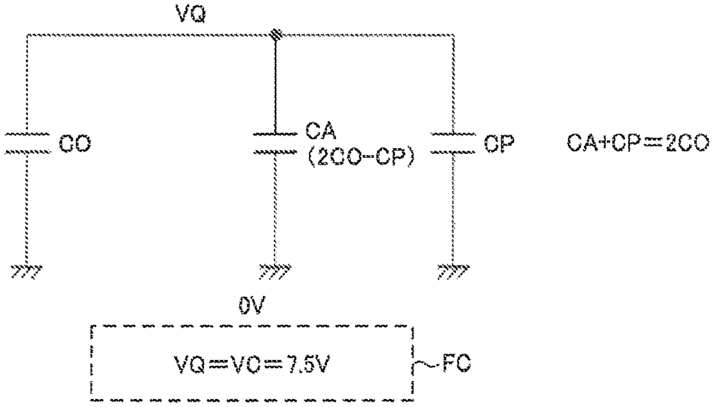
FIG. 11B MAXIMUM DATA VOLTAGE
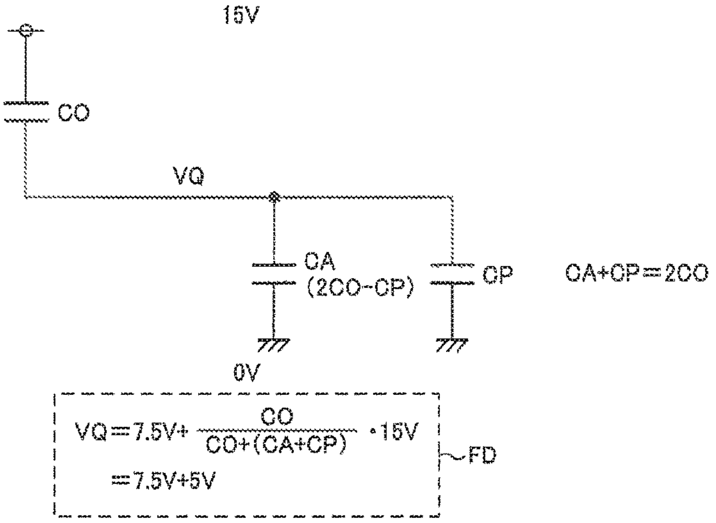
FIG. 11C
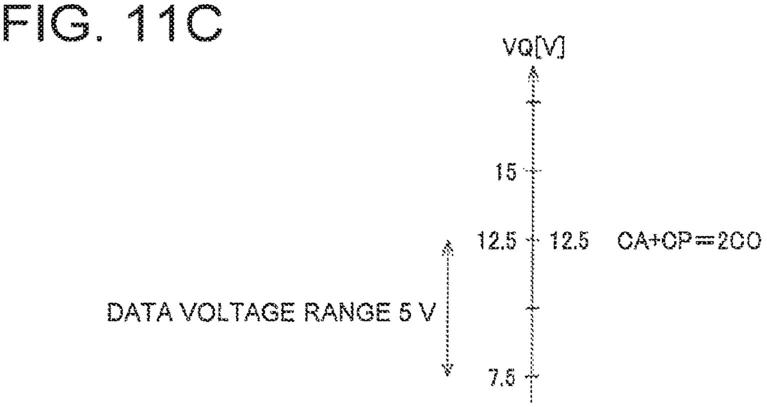

FIG. 15A (S8:NO)
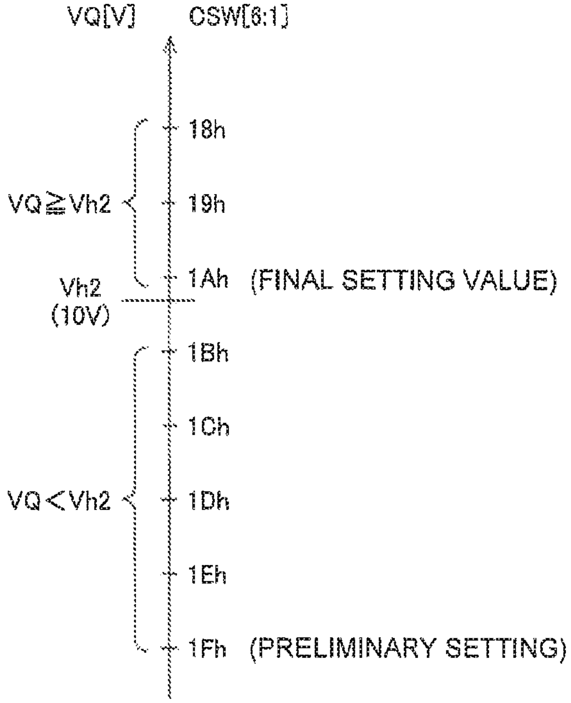
FIG. 15B (S8:YES)
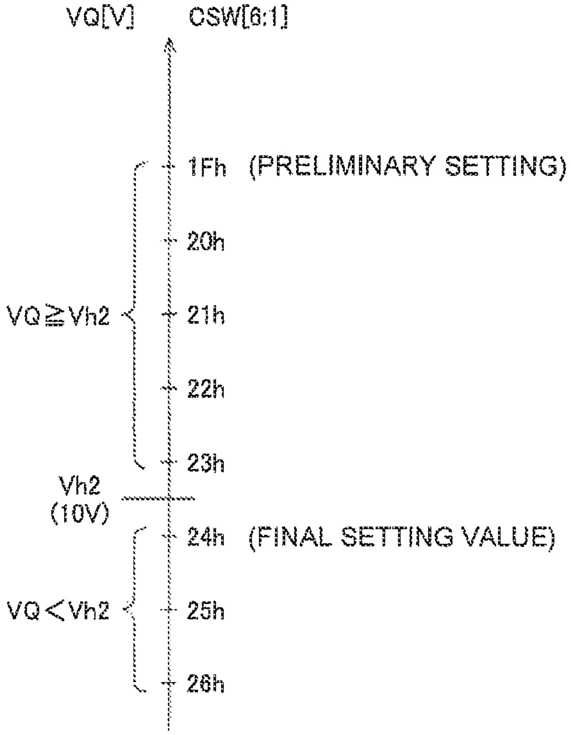

DRIVER AND ELECTRONIC DEVICE

CROSS-REFERENCE TO RELATED APPLICATION(S)

This application is a divisional of U.S. application Ser. No. 14/925,319 filed Oct. 28, 2015, which is based on and claims priority under 35 U.S.C. 119 from Japanese Patent Application No. 2014-226884 filed on Nov. 7, 2014. The contents of the above applications are incorporated herein by reference.

BACKGROUND

1. Technical Field

The present invention relates to drivers, electronic devices, and the like.

2. Related Art

Display devices (liquid-crystal display devices, for example) are used in a variety of electronic devices, including projectors, information processing apparatuses, mobile information terminals, and the like. Increases in the resolutions of such display devices continue to progress, and as a result, the time a driver drives a single pixel is becoming shorter. For example, phase expansion driving is used as a method for driving an electro-optical panel (a liquid-crystal display panel, for example). According to this driving method, for example, eight source lines are driven at one time, and the process is repeated 160 times to drive 1,280 source lines. In the case where a WXGA (1,280×768 pixels) panel is to be driven, the stated 160 instances of driving (that is, the driving of a single horizontal scanning line) is thus repeated 768 times. Assuming a refresh rate of 60 Hz, a simple calculation shows that the driving time for a single pixel is approximately 135 nanoseconds. In actuality, there are periods where pixels are not driven (blanking intervals and the like, for example), and thus the driving time for a single pixel becomes even shorter, at approximately 70 nanoseconds.

With a shorter pixel driving time as mentioned above, it is becoming difficult for the amplifier circuits to finish writing the data voltages within the required time. A method that drives an electro-optical panel through capacitor charge redistribution (called "capacitive driving" hereinafter) can be considered as a driving method for solving such problems. For example, JP-A-2000-341125 and JP-A-2001-156641 disclose techniques that use capacitor charge redistribution in D/A conversion. In a D/A conversion circuit, both driving-side capacitance and load-side capacitance are included in an IC, and charge redistribution occurs between those capacitances. For example, assume such a load-side capacitance of the D/A conversion circuit is replaced with the capacitance of the electro-optical panel external to the IC and used as a driver. In this case, charge redistribution occurs between the driver-side capacitance and the electro-optical panel-side capacitance.

The capacitive driving that thus uses charge redistribution has a problem in that the data voltage accuracy lowers as compared with when using the amplifier circuit, which is capable of supplying charges freely. As a driving method for solving such a problem, a method (called "voltage driving" hereinafter) can be considered that further outputs highly-accurate data voltage using the amplifier circuit after starting high-speed driving through the capacitive driving. In this case, a D/A conversion circuit is provided that outputs a voltage corresponding to tone data to the amplifier circuit.

However, a problem arises in that, in the case where it takes long time for the output of the D/A conversion circuit (input of the amplifier circuit) to settle at the voltage corresponding to the tone data, it will also take long time for the output of the amplifier circuit, which receives the output of the D/A conversion circuit, to settle at a data voltage. For this reason, there is a possibility that highly-accurate data voltage cannot be written within pixel writing time.

SUMMARY

According to some aspects of the invention, a driver, an electronic device, and the like can be provided that can shorten settling time of output of an amplifier circuit in voltage driving.

One aspect of this invention concerns a driver including: a voltage driving circuit that amplifies a voltage of an input node and outputs the amplified voltage as a data voltage to a data voltage output terminal; a D/A conversion circuit that selects a reference voltage corresponding to tone data from among a plurality of reference voltages, and outputs the selected reference voltage to the input node of the voltage driving circuit; an auxiliary capacitor driving circuit that outputs first to nth auxiliary capacitor driving voltages (n is a natural number of 2 or more) corresponding to the tone data to first to nth auxiliary capacitor driving nodes; and an auxiliary capacitor circuit having first to nth auxiliary capacitors provided between the input node of the voltage driving circuit and the first to nth auxiliary capacitor driving nodes.

According to this aspect of the invention, the auxiliary capacitor driving circuit outputs the first to nth auxiliary capacitor driving voltage and drives the first to nth auxiliary capacitors, charge redistribution thereby occurs between the first to nth auxiliary capacitors and a parasitic capacitance of the input node of the voltage driving circuit, and a voltage corresponding to the tone data is set to the input node of the voltage driving circuit. The input of the voltage driving circuit can thereby be settled quickly, and the settling time of the output of the amplifier circuit can be shortened in voltage driving.

In one aspect of this invention, the driver may further include: a capacitor driving circuit that outputs first to nth capacitor driving voltages corresponding to the tone data to first to nth capacitor driving nodes; and a capacitor circuit having first to nth capacitors provided between the first to nth capacitor driving nodes and the data voltage output terminal, and after capacitive driving for driving an electro-optical panel is started by the capacitor driving circuit and the capacitor circuit, the voltage driving circuit carries out voltage driving for outputting the data voltage to the data voltage output terminal.

Thus, starting the capacitive driving first makes it possible to settle the data voltage quickly, and by then carrying out the voltage driving thereafter, the data voltage can be outputted at a higher level of accuracy than in capacitive driving. Thereby, both high-speed driving through the capacitive driving and highly-accurate driving through the voltage driving can be achieved.

In one aspect of this invention, a capacitance of an ith auxiliary capacitor (i is a natural number no greater than n) in the first to nth auxiliary capacitors may be smaller than a capacitance of an ith capacitor in the first to nth capacitors.

The parasitic capacitance of the input node of the voltage driving circuit (input gate capacitance of the amplifier circuit, interconnect capacitance of the input node, and the like, for example) is smaller than the electro-optical panel-side capacitance. Thus, the capacitance of the auxiliary capacitor circuit can be made smaller than the capacitance of the capacitor circuit in capacitive driving. Because the RC time constant in charge redistribution is thereby made small, the input voltage of the voltage driving circuit can be driven quickly by the auxiliary voltage setting circuit.

In one aspect of this invention, the auxiliary capacitor circuit may have a switching circuit provided between the input node of the voltage driving circuit and the first to nth auxiliary capacitors.

Because the auxiliary capacitor circuit is seen as a load capacitance as viewed from the output of the D/A conversion circuit, the RC time constant of the output of the D/A conversion circuit increases. With respect to this point, according to this aspect of the invention, the auxiliary capacitor circuit can be disconnected from the input node of the voltage driving circuit by turning off the switching circuit. Thereby, high-speed settling is enabled by the auxiliary voltage setting circuit without increasing the time taken for the input voltage of the voltage driving circuit to settle at the output voltage of the D/A conversion circuit.

In one aspect of this invention, the switching circuit may turn off from an on state before the voltage driving circuit starts voltage driving for outputting the data voltage to the data voltage output terminal.

Thus, accurate voltage can be supplied to the input node of the voltage driving circuit by the D/A conversion circuit by turning on the switching circuit to carry out high-speed driving using the auxiliary voltage setting circuit and thereafter turning off the switching circuit. Then, by starting voltage driving after turning off the switching circuit, voltage driving can be carried out with accurate voltage by the D/A conversion circuit.

In one aspect of this invention, the voltage driving circuit may include: an amplifier circuit that outputs the data voltage; and a voltage driving switching circuit provided between output of the amplifier circuit and the data voltage output terminal, and the switching circuit of the auxiliary capacitor circuit turns off from an on state before the voltage driving switching circuit turns on from an off state.

Because capacitive driving is faster than driving using an amplifier circuit, an output voltage is pulled toward the output of the amplifier circuit and approaches the data voltage more slowly when voltage driving and capacitive driving are carried out simultaneously. With respect to this point, according to this aspect of the invention, providing the voltage driving switching circuit makes it possible to disconnect the output of the amplifier circuit and the data voltage output terminal, and output the data voltage through high-speed capacitive driving. Then, as a result of the switching circuit of the auxiliary capacitor circuit turning off from an on state before the voltage driving switching circuit turning on from an off state, the auxiliary capacitor circuit can be disconnected from the output of the D/A conversion circuit before voltage driving is started.

In one aspect of this invention, the voltage driving circuit may be an inverting amplifier circuit.

In the inverting amplifier circuit, because the voltage of a summing node is fixed to a constant voltage, the input voltage of a differential pair does not change even at an end of the output range. Thus, favorable characteristics (settling time, for example) can easily be acquired in a wider output range than with a noninverting amplifier circuit such as a voltage follower.

In one aspect of this invention, the auxiliary capacitor driving circuit may output the first to nth auxiliary capacitor driving voltages corresponding to logically inverted data of the tone data.

Thus, because the auxiliary voltage setting circuit carries out inverting output (i.e., outputs a voltage in a voltage range obtained by inverting the output range in the capacitive driving with respect to a prescribed reference voltage), the voltage driving can be carried out using the inverting amplifier circuit.

According to another aspect of the invention, the driver may further include a variable capacitance circuit provided between the data voltage output terminal and a reference voltage node; and a capacitance of the variable capacitance circuit may be set so that the capacitance obtained by adding a capacitance of the variable capacitance circuit and an electro-optical panel-side capacitance is in a prescribed capacitance ratio relationship with a capacitance of the capacitor circuit.

Accordingly, even if the electro-optical panel-side capacitance is different, the prescribed capacitance ratio relationship can be realized by adjusting the capacitance of the variable capacitance circuit in accordance therewith, and a desired data voltage range that corresponds to that capacitance ratio relationship can be realized. In other words, capacitive driving that is generally applicable in a variety of connection environments (the type of the electro-optical panel connected to the driver, the design of a printed circuit board on which the driver is mounted, and so on, for example) can be realized.

Another aspect of the invention concerns an electronic device including any of the drivers described above.

BRIEF DESCRIPTION OF THE DRAWINGS

The invention will be described with reference to the accompanying drawings, wherein like numbers reference like elements.

FIGS. 9A to 9C are diagrams illustrating data voltages in the first configuration example.

FIGS. 11A to 11C are diagrams illustrating data voltages in the third configuration example.

FIGS. 15A and 15B are diagrams illustrating a process for setting a capacitance of a variable capacitance circuit.

DESCRIPTION OF EXEMPLARY EMBODIMENTS

Hereinafter, preferred embodiments of the invention will be described in detail. Note that the embodiments described hereinafter are not intended to limit the content of the invention as described in the appended claims in any way, and not all of the configurations described in these embodiments are required as the means to solve the problems as described above.

1. First Example of Configuration of Driver

Figure 1:
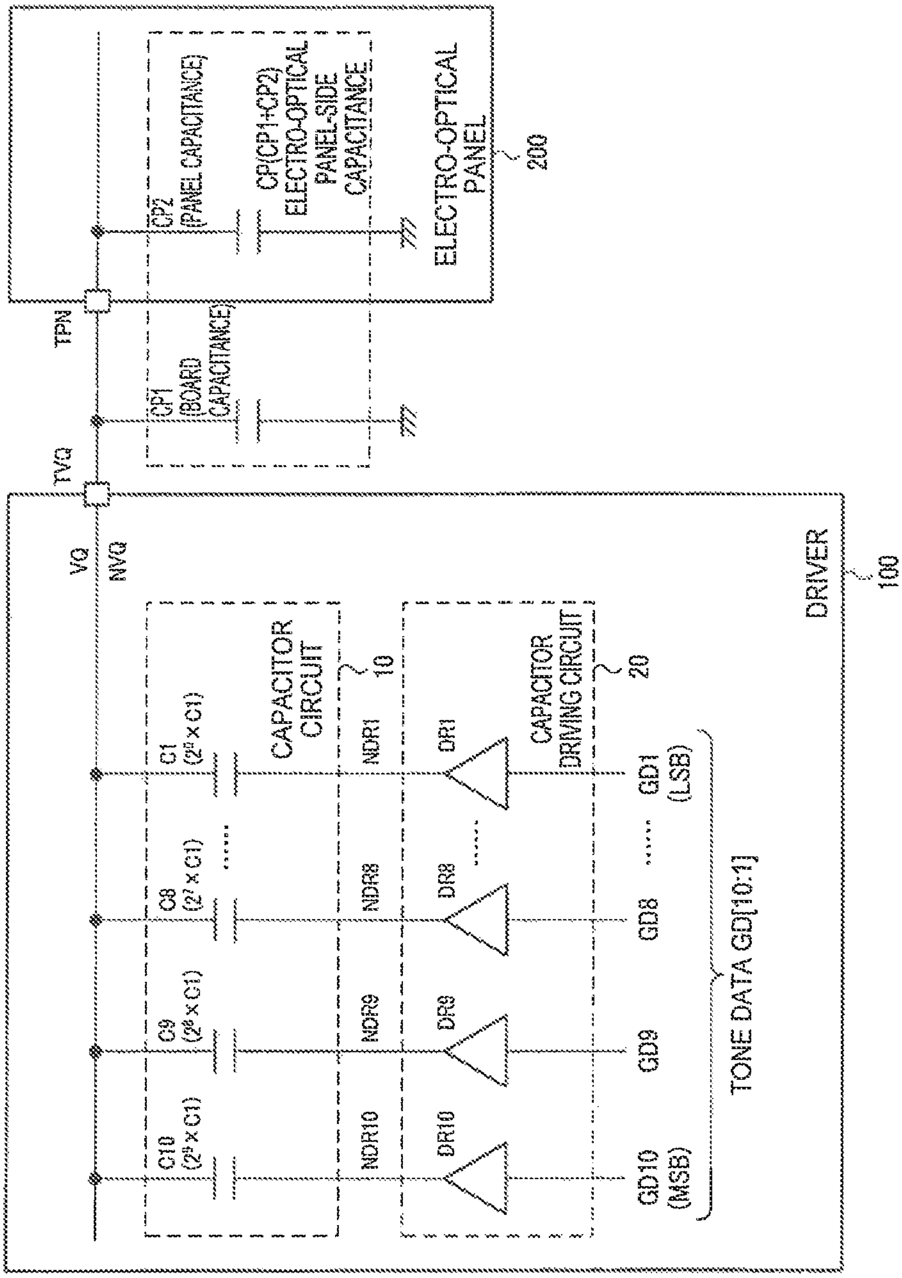
FIG. 1 illustrates a first example of the configuration of a driver.

FIG. 1 illustrates a first example of the configuration of a driver according to this embodiment. This driver 100 includes a capacitor circuit 10, a capacitor driving circuit 20, and a data voltage output terminal TVQ. Note that in the following, the same sign as a sign for a capacitor is used as a sign indicating a capacitance value of that capacitor.

The driver 100 is constituted by an integrated circuit (IC) device, for example. The integrated circuit device corresponds to an IC chip in which a circuit is formed on a silicon substrate, or a device in which an IC chip is held in a package, for example. Terminals of the driver 100 (the data voltage output terminal TVQ and so on) correspond to pads or package terminals of the IC chip.

The capacitor circuit 10 includes first to nth capacitors C1 to Cn (where n is a natural number of 2 or more). The capacitor driving circuit 20 includes first to nth driving units DR1 to DRn. Although the following describes a case where n=10 as an example, n may be any natural number greater than or equal to 2. For example, n may be set to the same number as the bit number of tone data.

One end of an ith capacitor in the capacitors C1 to C10 (where i is a natural number no greater than n, which is 10) is connected to a capacitor driving node NDRi, and another end of the ith capacitor is connected to a data voltage output node NVQ. The data voltage output node NVQ is a node connected to the data voltage output terminal TVQ. The capacitors C1 to C10 have capacitance values weighted by a power of 2. Specifically, the capacitance value of the ith capacitor Ci is $2^{(i-1)}$×C1.

An ith bit GDi of tone data GD [10:1] is inputted into an input node of an ith driving unit DRi of the first to tenth driving units DR1 to DR10. An output node of the ith driving unit DRi corresponds to the ith capacitor driving node NDRi. The tone data GD [10:1] is constituted of first to tenth bits GD1 to GD10 (first to nth bits), where the bit GD1 corresponds to the LSB and the bit GD10 corresponds to the MSB.

The ith driving unit DRi outputs a first voltage level in the case where the bit GDi is at a first logic level and outputs a second voltage level in the case where the bit GDi is at a second logic level. For example, the first logic level is 0 (low-level), the second logic level is 1 (high-level), the first voltage level is a voltage at a low-potential side power source VSS (0 V, for example), and the second voltage level is a voltage at a high-potential side power source VDD (15 V, for example). For example, the ith driving unit DRi is constituted of a level shifter that level-shifts the inputted logic level (a 3 V logic power source, for example) to the output voltage level (15 V, for example) of the driving unit DRi, a buffer circuit that buffers the output of that level shifter, and so on.

As described above, the capacitance values of the capacitors C1 to C10 are weighted by a power of 2 that is based on the order of the bits GD1 to GD10 in the tone data GD [10:1]. The driving units DR1 to DR10 output 0 V or 15 V in accordance with the bits GD1 to GD10, and the capacitors C1 to C10 are driven by those voltages. As a result of this driving, charge redistribution occurs between the capacitors C1 to C10 and an electro-optical panel-side capacitance CP, and a data voltage is outputted to the data voltage output terminal TVQ as a result.

The electro-optical panel-side capacitance CP is the sum of capacitances as viewed from the data voltage output terminal TVQ. For example, the electro-optical panel-side capacitance CP is a result of adding a board capacitance CP1 that is parasitic capacitance of a printed circuit board with a panel capacitance CP2 that is parasitic capacitance, pixel capacitances, and the like within an electro-optical panel 200.

Specifically, the driver 100 is mounted on a rigid board as an integrated circuit device, a flexible board is connected to that rigid board, and the electro-optical panel 200 is connected to that flexible board. Interconnects are provided on the rigid board and the flexible board for connecting the data voltage output terminal TVQ of the driver 100 to a data voltage input terminal TPN of the electro-optical panel 200. Parasitic capacitance of these interconnects corresponds to the board capacitance CP1. Meanwhile, as will be described later with reference to FIG. 19, data lines connected to the data voltage input terminal TPN, source lines, switching elements that connect the data lines to the source lines, pixel circuits connected to the source lines, and so on are provided in the electro-optical panel 200. The switching elements are constituted by TFTs (Thin Film Transistors), for example, and there is parasitic capacitance between the sources and gates thereof. Many switching elements are connected to the data lines, and thus the parasitic capacitance of many switching elements is present on the data lines. Parasitic capacitance is also present between data lines, source lines, or the like and a panel substrate. In the liquid-crystal display panel, there is capacitance in the liquid-crystal pixels. The panel capacitance CP2 is the sum of those capacitances.

The electro-optical panel-side capacitance CP is 50 pF to 120 pF, for example. As will be described later, to ensure a ratio of 1:2 between a capacitance CO of the capacitor circuit 10 (the sum of the capacitances of the capacitors C1 to C10) and the electro-optical panel-side capacitance CP, the capacitance CO of the capacitor circuit 10 is 25 pF to 60 pF. Although large as a capacitance internal to an integrated circuit, the capacitance CO of the capacitor circuit 10 can be achieved by a cross-sectional structure that, for example, vertically stacks two to three levels of MIM (Metal Insulation Metal) capacitors.

2. Data Voltages

Next, data voltages outputted by the driver 100 with respect to the tone data GD [10:1] will be described. Here, it is assumed that the capacitance CO of the capacitor circuit 10 (=C1+C2+ . . . C10) is set to CP/2.

Figure 2A:
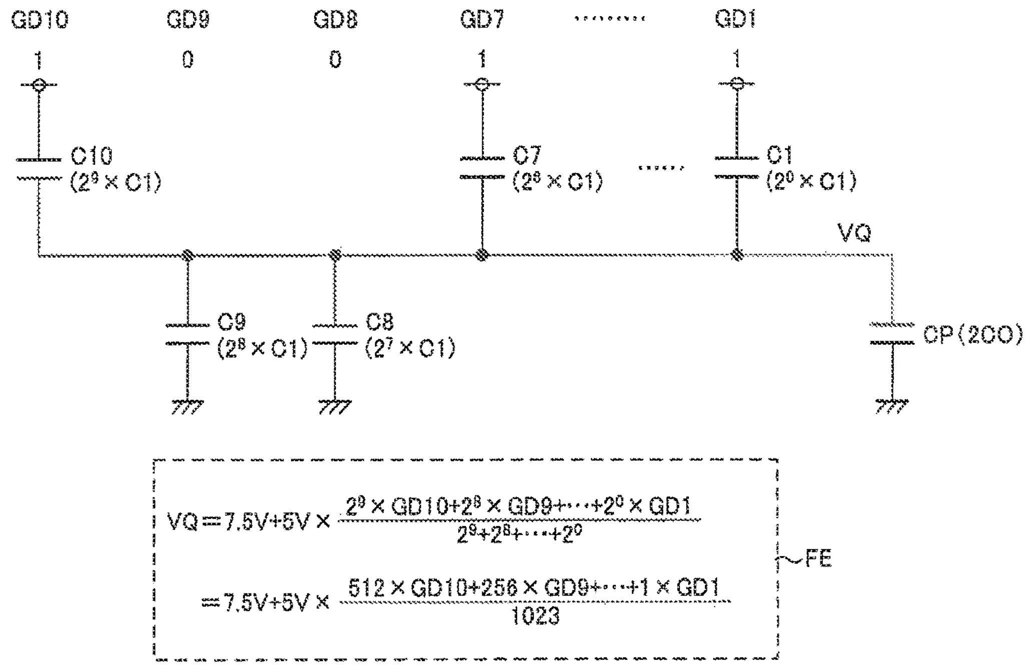
FIGS. 2A and 2B are diagrams illustrating data voltages corresponding to tone data.

As illustrated in FIG. 2A, the driving unit DRi outputs 0 V in the case where the ith bit GDi is "0", and the driving unit DRi outputs 15 V in the case where the ith bit GDi is "1". FIG. 2A illustrates an example of a case where GD[10:1]="1001111111b" (the b at the end indicates that the number within the "is binary).

First, a reset is carried out prior to driving. In other words, GD[10:1] is set to "0000000000b", 0 V is outputted to the driving units DR1 to DR10, and a voltage VQ is set to VC=7.5 V. VC=7.5 V corresponds to a reset voltage.

Figure 2B:
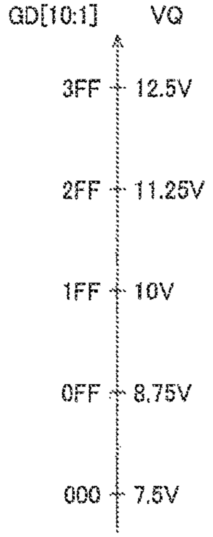

In this reset, a charge accumulated at the data voltage output node NVQ is also conserved in the driving carried out thereafter, and thus based on the principle of charge conservation, Formula FE in FIG. 2A is found. In Formula FE, the sign GDi expresses the value of the bit GDi ("0" or "1"). Looking at the second term on the right side of Formula FE, it can be seen that the tone data GD [10:1] is converted into 1,024-tone data voltages (5 V×0/1,023, V×1/1,023, 5 V×2/1,023, . . . , 5 V×1,023/1,023). FIG. 2B illustrates a data voltage (the output voltage VQ) when the most significant three bits of the tone data GD [10:1] have been changed as an example.

Although positive-polarity driving has been described as an example thus far, it should be noted that negative-polarity driving may be carried out in this embodiment. Inversion driving that alternates positive-polarity driving and negative-polarity driving may be carried out as well. In negative-polarity driving, the outputs of the driving units DR1 to DR10 in the capacitor driving circuit 20 are all set to 15 V in the reset, and the output voltage VQ is set to VC=7.5 V. The logic level of each bit in the tone data GD [10:1] is inverted ("O" to "1" and "1" to "O"), inputted into the capacitor driving circuit 20, and capacitive driving is carried out. In this case, a VQ of 7.5 V is outputted with respect to tone data GD [10:1] of "000h" (the h at the end indicates that the number within the "is sexadecimal), a VQ of 2.5 V is outputted with respect to tone data GD [10:1] of "3FFh", and the data voltage range becomes 7.5 V to 2.5 V.

In this manner, a data voltage corresponding to the tone data GD [10:1] can be outputted by causing charge redistribution to occur between the capacitance CO of the capacitor circuit 10 and the electro-optical panel-side capacitance CP and carrying out capacitive driving. By carrying out driving through the charge redistribution, higher-speed settling is enabled than in a case of amplifier driving that settles voltage through feedback control.

3. Comparative Example

In the driving of the electro-optical panel 200, precharge driving that writes a precharge voltage to the source lines before an image is displayed is carried out. This is done in order to increase the display quality by starting display driving after first setting all of the source lines to the same voltage. Capacitive driving has a problem in that the conservation of the charge at the data voltage output node NVQ breaks down and error arises in the data voltage due to this precharge driving. This point will be described hereinafter.

First, the configuration and a method of driving the electro-optical panel 200 will be described briefly using FIGS. 19 and 7.

The following descriptions will use a data line DL1 and a source line SL1 as examples. As illustrated in FIG. 19, the data line DL1 of the electro-optical panel 200 is driven by a data line driving circuit DD1 of the driver 100. The data line driving circuit DD1 corresponds to the capacitor circuit 10 and the capacitor driving circuit 20 illustrated in FIG. 1. The data line DL1 is connected to the source line SL1 by a switching element SWEP1.

Figure 7:
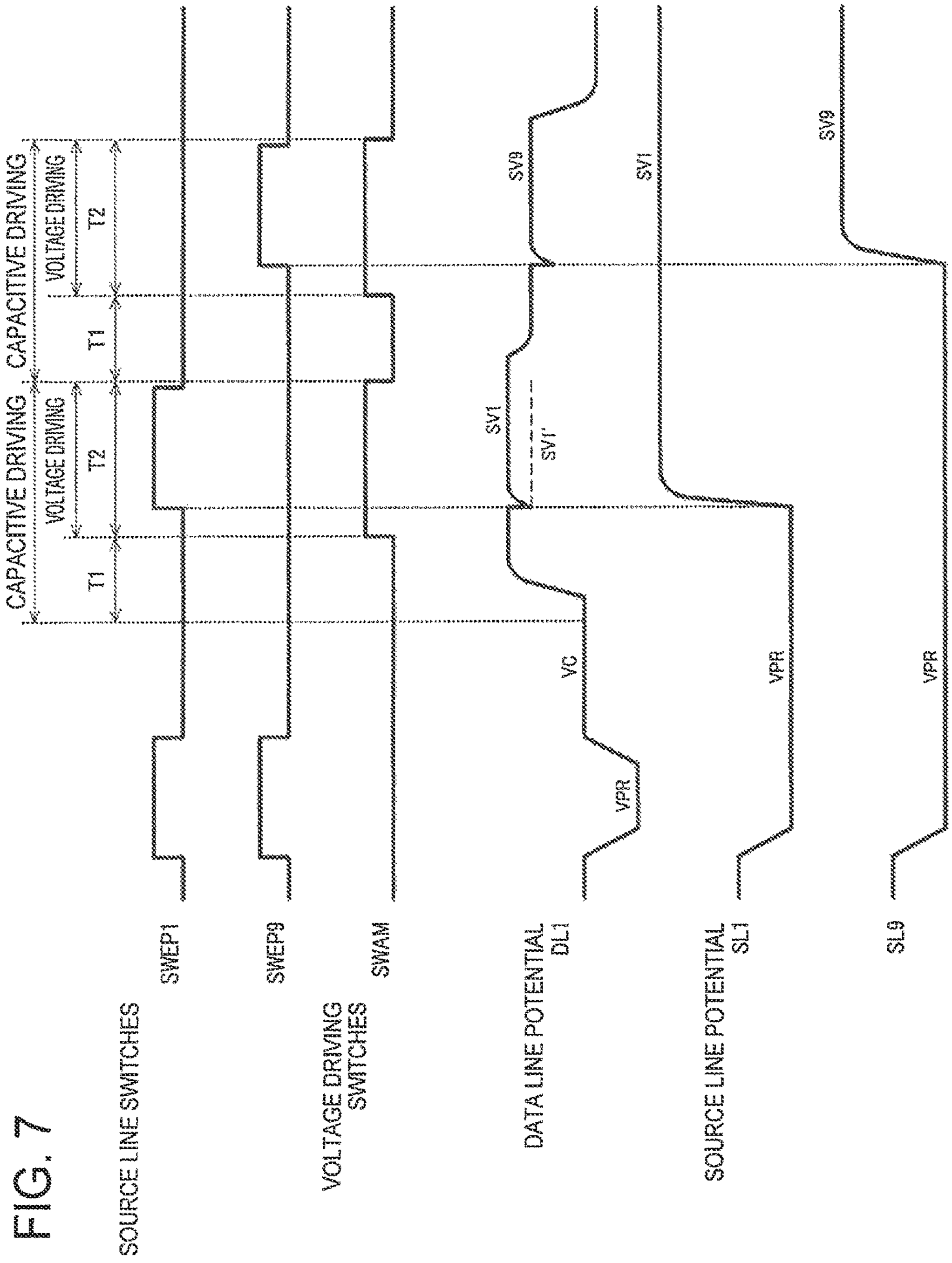
FIG. 7 is an operational timing chart regarding a voltage driving circuit in the second configuration example.

As illustrated in FIG. 7, first, the switching element SWEP1 turns on, the data line driving circuit DD1 outputs a precharge voltage VPR, and the data line DL1 and the source line SL1 are set to the precharge voltage VPR. Next, the switching element SWEP1 turns off, the data line driving circuit DD1 outputs a reset voltage VC, and the data line DL1 is set to the reset voltage VC. Next, the data line driving circuit DD1 starts capacitive driving, and the data line DL1 is driven by a data voltage SV1. Next, the switching element SWEP1 turns on, the data line DL1 and the source line SL1 are connected, and the data voltage SV1 is written to the source line SL1.

As described in the first configuration example, after the data line DL1 (the data voltage output node NVQ) is reset by the reset voltage VC, the charge in the data line DL1 is conserved, and a data voltage using the reset voltage VC as a reference is outputted. However, when the switching element SWEP1 turns on and the data line DL1 and the source line SL1 are connected, the source line SL1 is at the precharge voltage VPR (which is different from the source voltage SV1 of the data line DL1), and thus the conservation of the charge at the data line DL1 breaks down. Accordingly, the voltage at the data line DL1 shifts from SV1 to SV1', resulting in an error relative to the desired source voltage SV1.

The driver 100 according to this embodiment includes a reference voltage generating circuit 60, a D/A conversion circuit 70, and a voltage driving circuit 80, as will be described later with reference to FIG. 3. After capacitive driving is carried out by the capacitor circuit 10 and the output voltage VQ approaches the data voltage, voltage driving is carried out by an amplifier circuit AMVD of the voltage driving circuit 80. The D/A conversion circuit 70 performs D/A conversion on the tone data GD[10:1] and outputs the converted data, and the amplifier circuit AMVD, upon receiving the output data, outputs the data voltage. As illustrated in FIG. 7, the voltage driving starts before the switching element SWEP1 of the source line SL1 turns on.

As a result of the driving being thus carried out by the amplifier circuit AMVD after the output voltage VQ is brought toward the data voltage quickly through the capacitive driving, the data voltage can be highly accurately output as compared with a case of carrying out only the capacitive driving. That is to say, although an error occurs (SV1') in the voltage of the data line DL1 as a result of the switching element SWEP1 turning on as mentioned above, this error can be resolved and the voltage can be restored to the accurate voltage SV1 by the amplifier circuit AMVD outputting the voltage SV1.

However, because the amplifier circuit AMVD controls an output voltage AMQ through feedback, if settling of an input voltage AMI takes time, the settling time of the output voltage AMQ will also extend in accordance therewith. Specifically, the reference voltage generating circuit 60 generates reference voltages VR1 to VR1024 through resistance division using resistance elements RD1 to RD1024, and one of the reference voltages VR1 to VR1024 is selected by the D/A conversion circuit 70. For this reason, the RC time constant is determined based on the resistance of the reference voltage generating circuit 60 and the parasitic capacitance of an input node NAMI of the amplifier circuit AMVD, and the voltage of the input node NAMI will be settled based on this time constant. An input gate capacitance of the amplifier circuit AMVD, capacitances between a gate and a source (or a gate and a drain) of the respective switching elements SWD1 to SWD1024 of the D/A conversion circuit 70, and the like are parasitic on the input node NAMI.

In addition, as will be described later with reference to FIG. 16 and the like, a plurality of D/A conversion circuits (DAAM1, DAAM2 etc.) and amplifier circuits (AMVD1, AMVD2 etc.) are connected to the reference voltage generating circuit 60. Because the D/A conversion circuits each connect a tap for voltage divided by resistance of the reference voltage generating circuit 60 to an input node of the corresponding amplifier circuit via a switching element, the outputs of the D/A conversion circuits are in a state of being coupled to each other via the reference voltage generating circuit 60. For this reason, in the case where the output of one of a certain D/A conversion circuit (input of the corresponding amplifier circuit) has not settled, it will affect the outputs of the other D/A conversion circuits and cause crosstalk. From this viewpoint as well, it is important to quickly settle the outputs of the D/A conversion circuits (inputs of the amplifier circuits).

Figure 3:
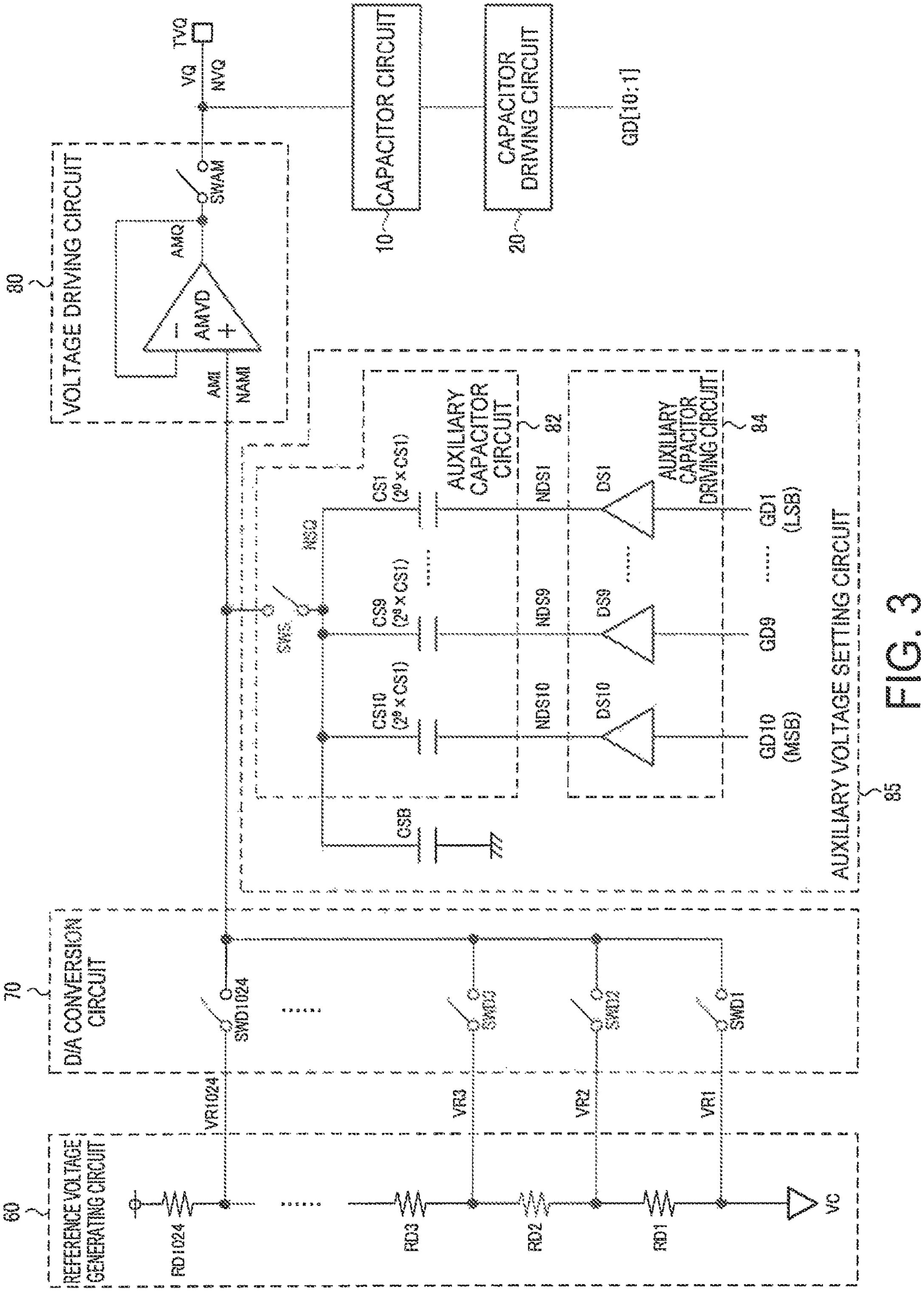
FIG. 3 illustrates a second example of the configuration of a driver.
Figure 4:
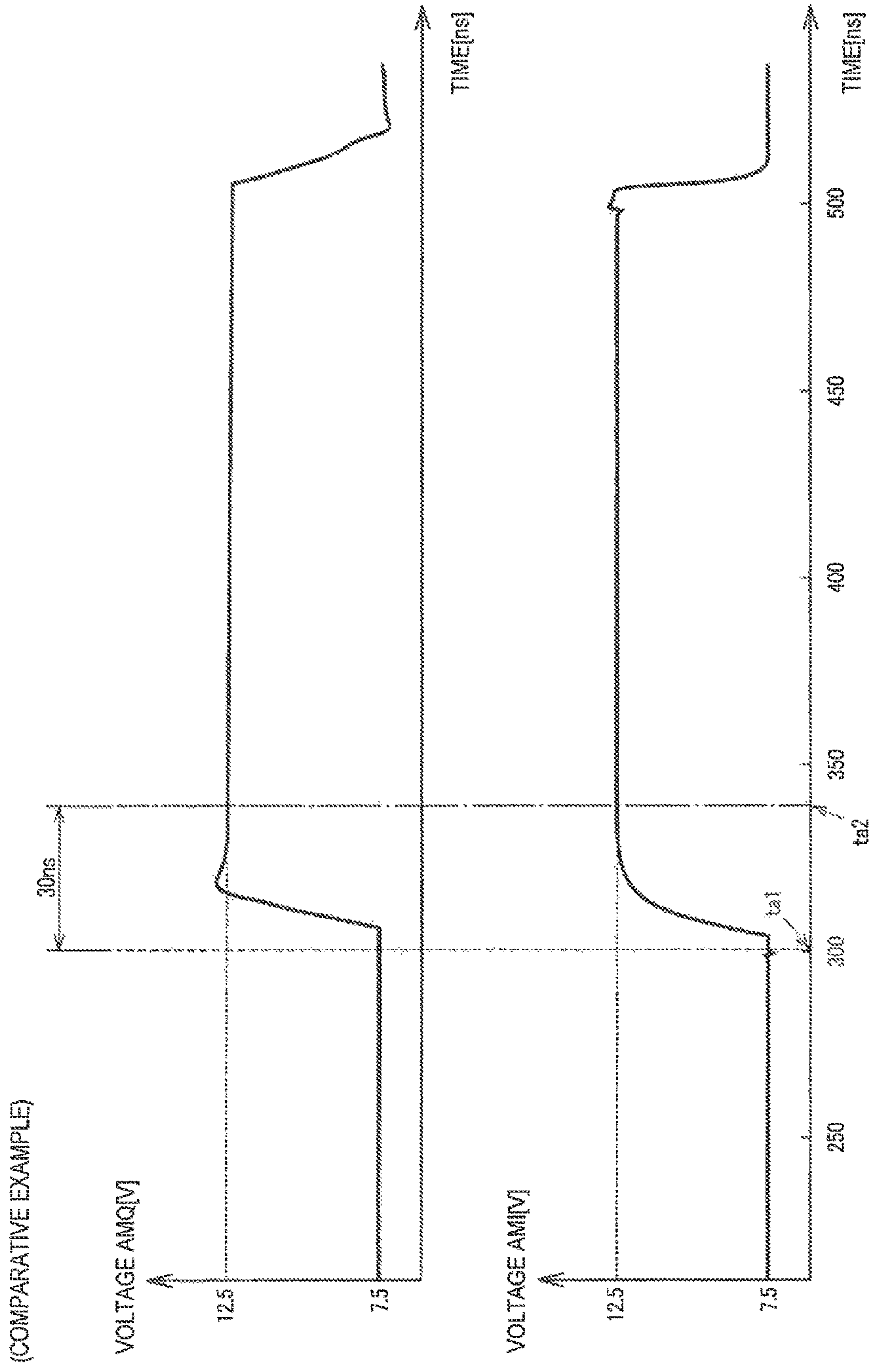
FIG. 4 illustrates a simulation result in a comparative example.

FIG. 4 shows a result of simulation of output (AMI) of a D/A conversion circuit and output (AMQ) of an amplifier circuit in a comparative example of the driver according to this embodiment. The configuration in the comparative example is the same as the later-described configuration example illustrated in FIG. 3 except that an auxiliary voltage setting circuit 85 according to this embodiment is not included.

FIG. 4 shows a simulation result in the case of increasing the output voltage AMQ from the reset voltage VC, which is 7.5 V, to the data voltage maximum value, which is 12.5 V. At time ta1, the D/A conversion circuit 70 starts to output 12.5 V, which corresponds to a result of D/A conversion, to the input node NAMI of the amplifier circuit AMVD. Then, the input voltage AMI of the amplifier circuit AMVD increases, and the input voltage AMI reaches 12.5 V at time ta2. The time ta2 corresponds to 6*i* with respect to the RC time constant τ, for example. ta2−ta1 is about 30 nanoseconds, and a time longer than 30 nanoseconds will be taken for the output voltage AMQ of the amplifier circuit AMVD to accurately settle at 12.5 V. Because the pixel write time is 70 nanoseconds in WXGA, 30 nanoseconds is long even if settling is possible, and moreover, it becomes a problem for achieving a higher resolution than in WXGA.

4. Second Example of Configuration of Driver

FIG. 3 illustrates a second example of the configuration of a driver according to this embodiment, capable of solving the stated problem. This driver 100 includes the capacitor circuit 10, the capacitor driving circuit 20, a reference voltage generation circuit 60, a D/A conversion circuit 70 (a voltage selection circuit), a voltage driving circuit 80, an auxiliary voltage setting circuit 85, and the data voltage output terminal TVQ. Note that constituent elements that are the same as constituent elements already described are assigned the same reference numerals, and descriptions of those constituent elements are omitted as appropriate.

The auxiliary voltage setting circuit 85 is a circuit that sets a voltage corresponding to the data voltage (a voltage of the data voltage output terminal TVQ) to the input node NAMI of the voltage driving circuit 80. Specifically, the auxiliary voltage setting circuit 85 includes an auxiliary capacitor circuit 82, an auxiliary capacitor driving circuit 84, and a balancing capacitor CSB.

The auxiliary capacitor circuit 82 includes first to tenth auxiliary capacitors CS1 to CS10 (broadly defined as first to nth auxiliary capacitors CS1 to CSn) and a switching circuit SWS. The auxiliary capacitor driving circuit 84 includes first to tenth auxiliary driving units DS1 to DS10 (broadly defined as first to nth auxiliary driving units DS1 to DSn).

One end of an ith auxiliary capacitor CSi (i is a natural number no greater than n, which is 10) in the auxiliary capacitors CS1 to CS10 is connected to an auxiliary capacitor driving node NDSi, and another end of the ith auxiliary capacitor CSi is connected to a node NSQ. The auxiliary capacitors CS1 to CS10 each have a capacitance value that is weighted by a power of 2. Specifically, the capacitance value of the ith auxiliary capacitor CSi is $2^{(i-1)}$×CS1.

An ith bit GDi of the tone data GD [10:1] is inputted to an input node of the ith auxiliary driving unit DSi in the first to tenth auxiliary driving units DS1 to DS10. An output node of the ith auxiliary driving unit DSi corresponds to an ith auxiliary capacitor driving node NDSi.

The ith auxiliary driving unit DSi outputs a first voltage level, which is 0 V, in the case where the bit GDi is at a first logic level that is 0, and outputs a second voltage level, which is 15 V, in the case where the bit GDi is at a second logic level that is 1. For example, the ith auxiliary driving unit DRi is constituted by a level shifter that level-shifts the inputted logic level (a 3 V logic power source, for example) to the output voltage level (15 V, for example) of the auxiliary driving unit DRi, and a buffer circuit that buffers the output of that level shifter.

The switching circuit SWS is provided between the node NSQ to which the auxiliary capacitors CS1 to CS10 are connected and the input node NAMI of the voltage driving circuit 80. When the switching circuit SWS turns on, the node NSQ and the node NAMI are connected. An on/off control signal of the switching circuit SWS is supplied from a control circuit 40 illustrated in FIG. 12, for example. A switching circuit SWAM may be constituted of a single switching element, or may be constituted of a circuit (a transfer gate, for example) including a plurality of switching elements, for example. Alternatively, a switching element may be provided between each of the auxiliary capacitors CS1 to CS10 and the node NAMI, rather than the auxiliary capacitors CS1 to CS10 being commonly connected to the node NSQ.

One end of the balancing capacitor CSB is connected to the node NSQ, and another end thereof is connected to a node of a low-potential side power source VSS. Assuming that the sum of a capacitance of the balancing capacitor CSB and the parasitic capacitance of the input node NAMI of the voltage driving circuit 80 is CSB', the capacitance of the balancing capacitor CSB is set such that CSB'=2CSO (CSO=CS1+CS2+ . . . +CS10), for example. Thus, a voltage (7.5 V to 12.5 V) corresponding to the tone data GD [10:1] is outputted to the node NAMI on the same principle as that of the capacitive driving that has been described with reference to FIG. 2A. The parasitic capacitance of the node NAMI may be estimated from a process parameter, a layout (interconnect length etc.), and the like, for example. Alternatively, it may be estimated based on a simulation result.

Note that, because the D/A conversion circuit 70 ultimately determines the input voltage AMI of the voltage driving circuit 80, the output of the auxiliary voltage setting circuit 85 does not need to strictly coincide with the output of the D/A conversion circuit 70. Accordingly, the relationship of CSB'=2CSO need only hold roughly.

The reference voltage generation circuit 60 is a circuit that generates reference voltages (tone voltages) corresponding to each value in the tone data. For example, reference voltages VR1 to VR1024 for the 1,024 tones are generated corresponding to the 10-bit tone data GD [10:1].

Specifically, the reference voltage generation circuit 60 includes first to 1,024th resistance elements RD1 to RF1024 connected in series between the high-potential side power source and a node at the reset voltage VC (a common voltage). The first to 1,024th reference voltages VR1 to VR1024, which are obtained through voltage division, are outputted from taps of the resistance elements RD1 to RF1024.

The D/A conversion circuit 70 is a circuit that selects a reference voltage corresponding to the tone data GD [10:1], from among the plurality of reference voltages from the reference voltage generation circuit 60. The selected reference voltage is outputted as the input voltage AMI to the input node NAMI of the voltage driving circuit 80.

Figure 12:
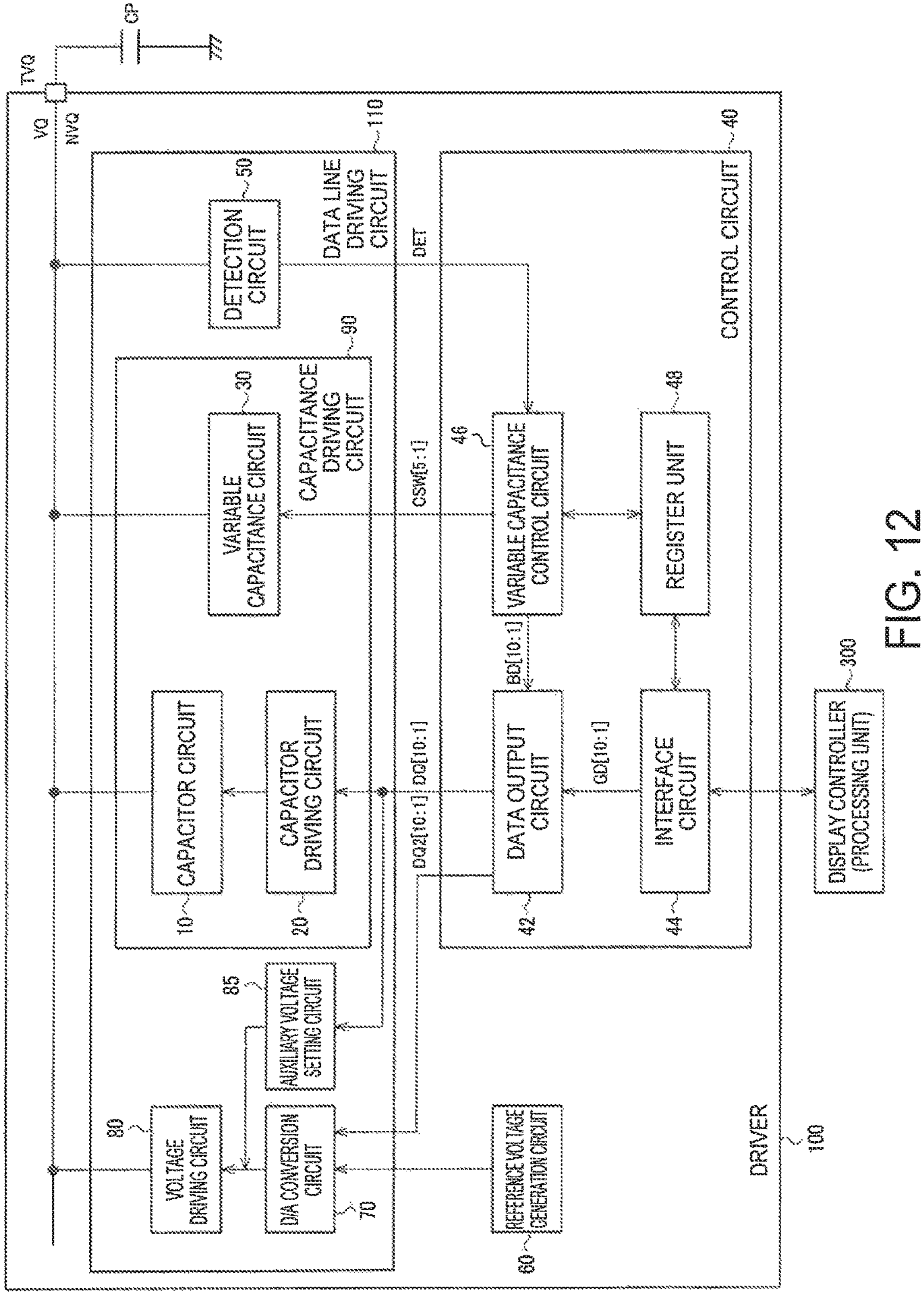
FIG. 12 illustrates an example of the detailed configuration of a driver.

Specifically, the D/A conversion circuit 70 includes first to 1,024th switching elements SWD1 to SWD1024 to one end of which the reference voltages VR1 to VR1024 are respectively supplied. Other ends of the switching elements SWD1 to SWD1024 are connected in common. One of the switching elements SWD1 to SWD1024 turns on in correspondence with the tone data GD [10:1], and the reference voltage supplied to that switching element is outputted as the voltage AMI. An on/off control signal for the switching elements SWD1 to SWD1024 is supplied from the control circuit 40, for example, as illustrated in FIG. 12. Alternatively, the D/A conversion circuit 70 may have a decoder that decodes the tone data GD [10:1], and the tone data GD [10:1] may be inputted to the decoder from the control circuit 40.

Note that the configuration of the D/A conversion circuit 70 is not limited to that illustrated in FIG. 3. For example, a tournament system may be used, where the switching elements are provided in multiple stages and the selection is carried out in tournament format. In the tournament system, for example, selectors that select a single reference voltage from among 16 reference voltages are stacked in two stages (16×16=256), and a selector that selects a single reference voltage from among the four reference voltages selected by the previous stages (256×4=1,024) is provided in the third stage.

The voltage driving circuit 80 amplifies the voltage AMI from the D/A conversion circuit 70 and outputs the amplified voltage to the data voltage output terminal TVQ (voltage driving). The voltage driving circuit 80 includes an amplifier circuit AMVD and a voltage driving switching circuit SWAM.

The amplifier circuit AMVD has an op-amp circuit, and the op-amp circuit is configured as, for example, a voltage follower. The voltage AMI from the D/A conversion circuit 70 is inputted into an input of the voltage follower.

The voltage driving switching circuit SWAM is a circuit that connects/disconnects the output of the amplifier circuit AMVD to/from the data voltage output node NVQ. The voltage driving switching circuit SWAM may, for example, be constituted of a single switching element, or may be configured as a circuit that includes a plurality of switching elements. An on/off control signal for the voltage driving switching circuit SWAM is supplied from the control circuit 40 (a timing controller, which is not shown), for example, as illustrated in FIG. 12.

5. Operation of Second Configuration Example

Figure 5:
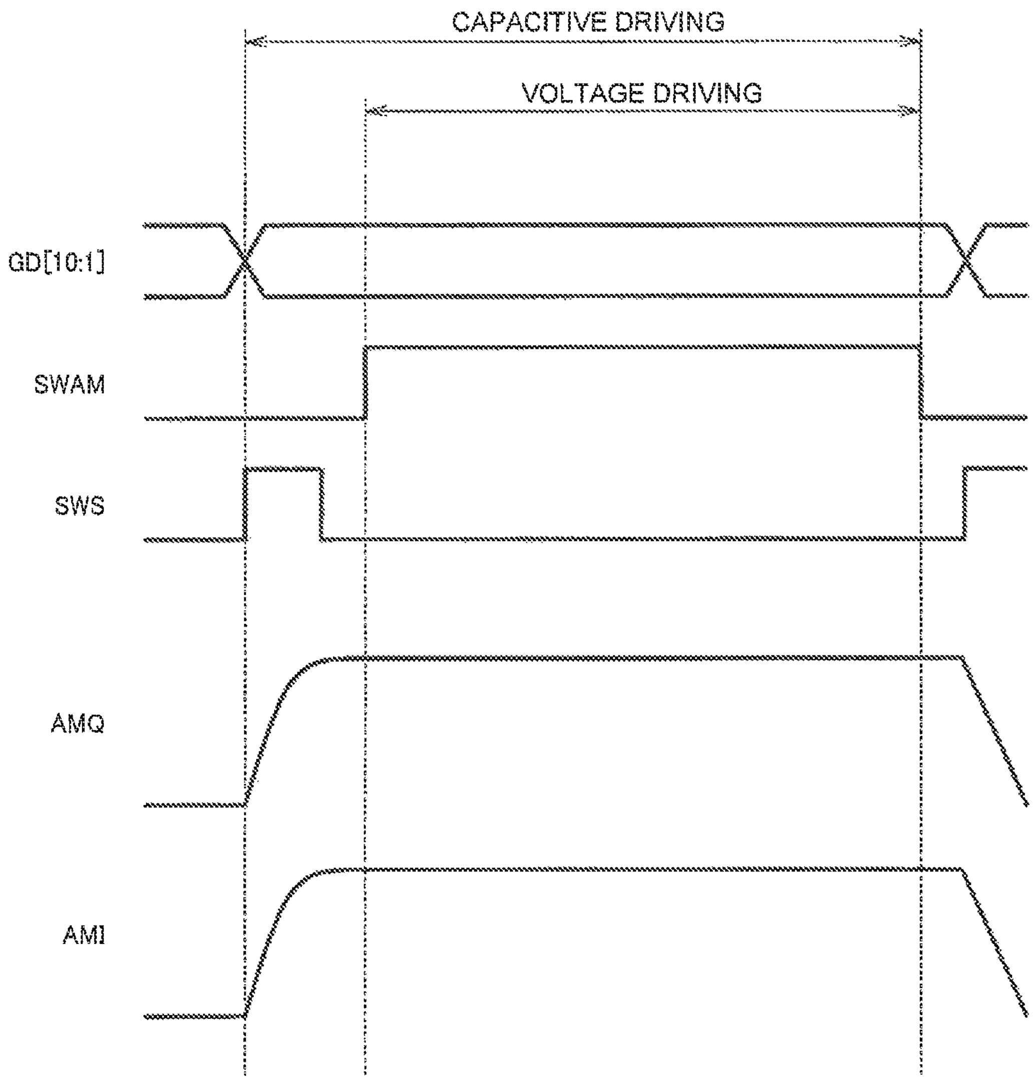
FIG. 5 is an operational timing chart regarding an auxiliary voltage setting circuit in the second configuration example.

FIG. 5 is an operational timing chart regarding the auxiliary voltage setting circuit in the second example of the configuration of the above-described driver. Note that high-level and low-level of waveforms SWS and SWAM indicate "on" and "off" of the switching circuits SWS and SWAM, respectively.

As illustrated in FIG. 5, upon the tone data GD [10:1] being inputted to the capacitor driving circuit 20, the capacitive driving using the capacitor circuit 10 is started. When this capacitive driving is started, the tone data GD [10:1] is inputted to the auxiliary capacitor driving circuit 84, and the switching circuit SWS turns on. Charge redistribution thereby occurs among the auxiliary capacitor circuit 82, the balancing capacitor CSB, and the parasitic capacitance of the node NAMI, and the voltage AMI of the input node NAMI of the amplifier circuit AMVD rapidly approaches the data voltage.

When the capacitive driving is started, the D/A conversion circuit 70 also starts to output a D/A conversion result. That is to say, the voltage AMI is rapidly brought close to the data voltage by the auxiliary voltage setting circuit 85, and the D/A conversion circuit 70 outputs a highly-accurate data voltage. Upon the switching circuit SWS turning off, the auxiliary capacitor circuit 82 and the balancing capacitor CSB cannot be seen from the output of the D/A conversion circuit 70, and accordingly the voltage AMI ultimately becomes the highly-accurate data voltage outputted by the D/A conversion circuit 70. Because the voltage AMI has been brought close to the data voltage by the auxiliary voltage setting circuit 85, only a short time is taken for the voltage AMI to be settled at an accurate data voltage by the D/A conversion circuit 70. After the switching circuit SWS turns off from an on state, the voltage driving switching circuit SWAM turns on from an off state, and the voltage driving is started.

Note that the on-period of the switching circuit SWS may be set to a period in which the voltage AMI is sufficiently brought close to the data voltage by the auxiliary voltage setting circuit 85. For example, the switching circuit SWS may be turned on only in a period in which the voltage AMI is sharply changed by the auxiliary voltage setting circuit 85, or the on-period may be set based on the time constant of this change (for example, an on-period that is several times of the time constant).

Figure 6:
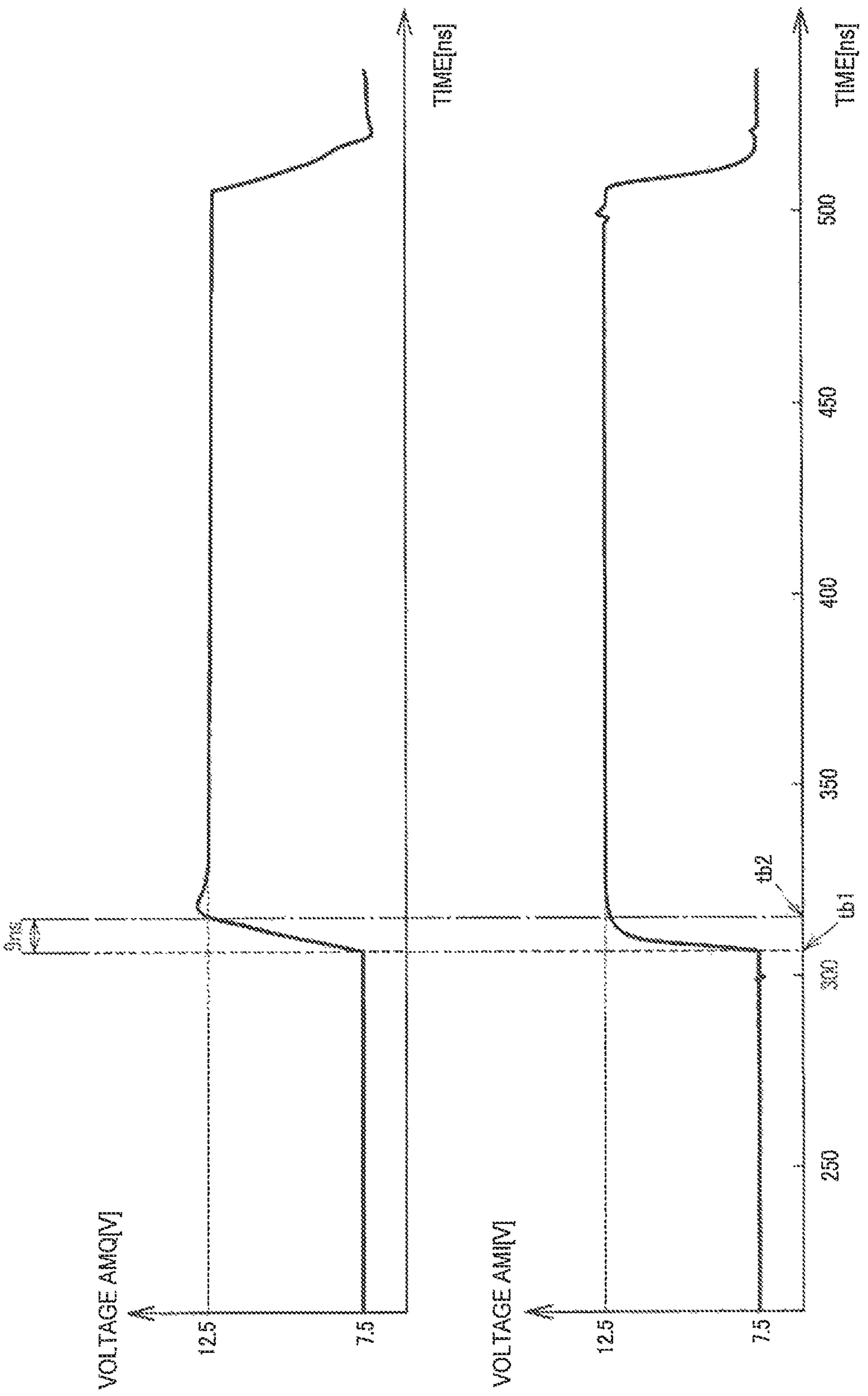
FIG. 6 illustrates a simulation result in the second configuration example.

FIG. 6 shows a result of simulation of the output (AMI) of the D/A conversion circuit and the output (AMQ) of the amplifier circuit in this embodiment. FIG. 6 shows a simulation result in the case of increasing the output voltage AMQ from the reset voltage VC, which is 7.5 V, to the maximum value of the data voltage, which is 12.5V.

At time tb1, the auxiliary voltage setting circuit 85 (and the D/A conversion circuit 70) starts to output a 12.5-V voltage to the input node NAMI of the amplifier circuit AMVD, and the input voltage AMI of the amplifier circuit AMVD rapidly increases. At time tb2 that is about 9 nanoseconds after the time tb1, the input voltage AMI reaches 12.5 V. In the comparative example illustrated in FIG. 4, it takes 30 nanoseconds until the input voltage AMI reaches 12.5 V. Meanwhile, in this embodiment, this time is shortened to about one third. As a result of the input voltage AMI of the amplifier circuit AMVD thus quickly settling, the output voltage AMQ of the amplifier circuit AMVD can be quickly settled as much, and an accurate data voltage can be outputted within the pixel write time.

Next, operations of the voltage driving circuit 80 will be described. FIG. 7 is an operational timing chart regarding the voltage driving circuit in the second example of the configuration of the driver. The following descriptions will take the data line DL1, the switching element SWEP1, and the source lines SL1 and SL9 illustrated in FIG. 19 as examples.

First, precharge driving and a reset using the reset voltage VC are carried out. Next, capacitive driving is started, and the data line DL1 is driven by the data voltage SV1. Once a period T1 has elapsed following the start of the capacitive driving, the switching circuit SWAM of the voltage driving circuit 80 turns on, and the amplifier circuit AMVD drives the data line DL1 at a voltage equal to the data voltage SV1. Next, the switching element SWEP1 turns on (this may be at the same time as the switching circuit SWAM turns on), and the source line SL1 is connected to the data line DL1. As described above, the voltage at the data line DL1 becomes SV1', but because the data voltage SV1 is supplied by the voltage driving circuit 80, the data voltage SV1 is written to the source line SL1.

Next, the switching element SWEP1 turns off, and thereafter, the switching circuit SWAM of the voltage driving circuit 80 turns off. A period in which the switching circuit SWAM is on is a period T2 in which voltage driving is carried out.

Driving is carried out in the same manner for the source line SL9 as well. In other words, the capacitive driving is started after the voltage driving period T2 ends, and a data voltage SV9 is outputted to the data line DL1. Once the period T1 has elapsed, the switching circuit SWAM turns on, and the amplifier circuit AMVD drives the data line DL1 at a voltage equal to the data voltage SV9. Next, a switching element SWEP9 turns on, and the data voltage SV9 is written to the source line.

As a result of the voltage driving circuit 80 thus carrying out the voltage driving, an error between the data voltages SV1 and SV9 that are written respectively onto the source lines SL1 and SL9 can be made small as compared with the case of using only the capacitive driving.

6. Modification of Driver

The description of the above embodiment describes an example in which the voltage driving circuit 80 is constituted by a voltage follower (broadly defined as a noninverting amplifier circuit). However, the configuration of the voltage driving circuit 80 is not limited thereto. For example, the following modification is possible.

Figure 8:
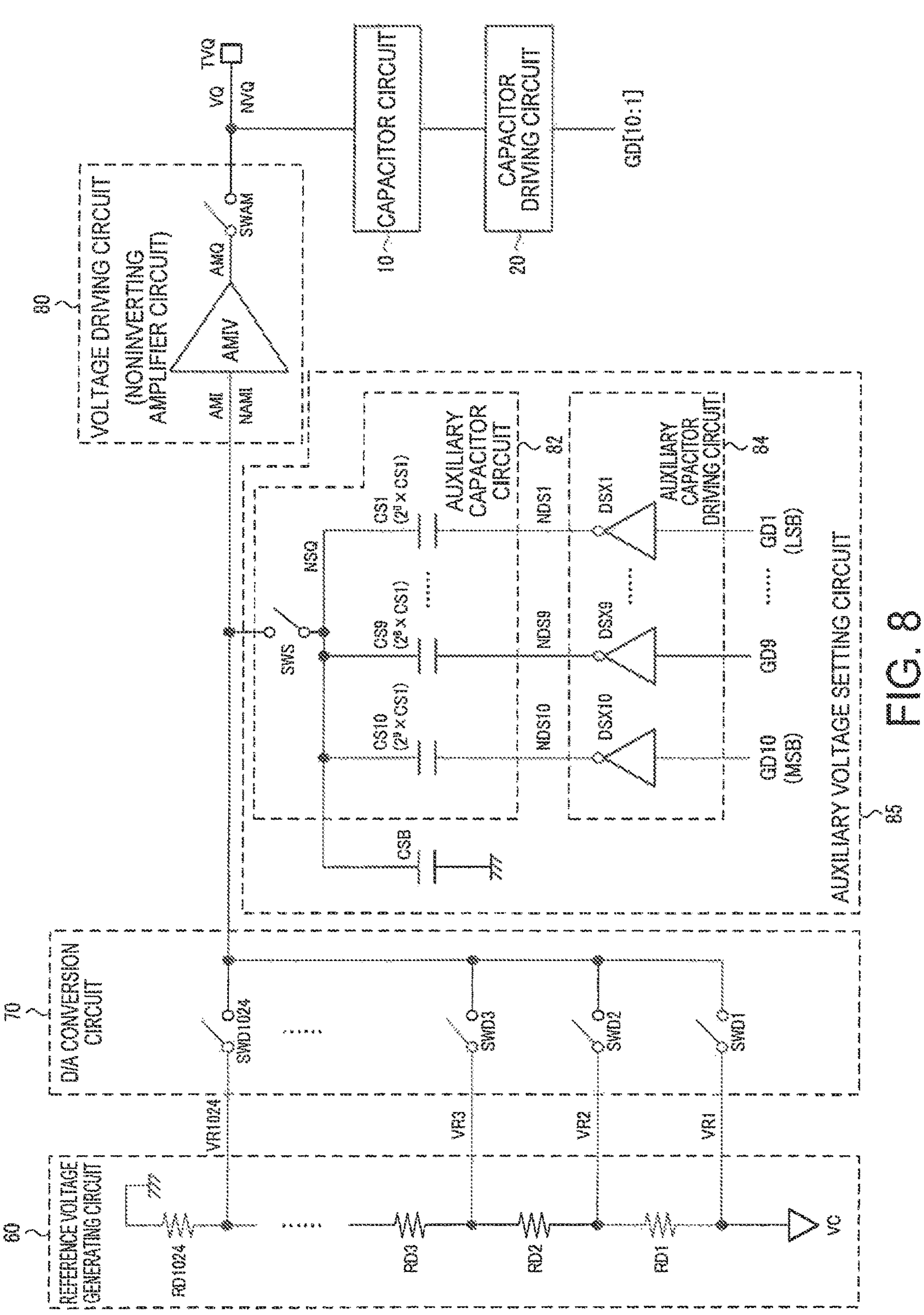
FIG. 8 illustrates an example of a modified configuration of a driver.

FIG. 8 shows an example of a modified configuration of the driver according to this embodiment. This driver 100 includes a capacitor circuit 10, a capacitor driving circuit 20, a reference voltage generating circuit 60, a D/A conversion circuit 70 (voltage selection circuit), a voltage driving circuit 80, an auxiliary voltage setting circuit 85, and a data voltage output terminal TVQ. Note that the same constituent elements as constituent elements already described are assigned the same reference numerals, and descriptions of these constituent elements will be omitted as appropriate.

The voltage driving circuit 80 includes an inverting amplifier circuit AMIV and a voltage driving switching circuit SWAM. The inverting amplifier circuit AMIV is a circuit that performs inverting amplification on the input voltage AMI (in the case where $AMI=VC-\Delta AMI$, for example, outputs $AMQ=VC+\Delta AMQ$). For example, the inverting amplifier circuit AMIV is constituted by an op-amp circuit having a positive input terminal to which a reference voltage (a common voltage VC, for example) is input, an input capacitor provided between an input node NAMI of the inverting amplifier circuit AMIV and a negative input terminal of the op-amp circuit, and a feedback capacitor provided between an output terminal of the op-amp circuit and the negative input terminal of the op-amp circuit.

The auxiliary voltage setting circuit 85 includes an auxiliary capacitor circuit 82, an auxiliary capacitor driving circuit 84, and a balancing capacitor CSB. The auxiliary capacitor driving circuit 84 includes first to tenth auxiliary driving units DSX1 to DSX10, which are inverting buffers. That is to say, an ith auxiliary driving unit DSXi outputs a second voltage level, which is 15 V, in the case where the bit GDi is at a first logic level that is 0, and outputs a first voltage level, which is 0 V, in the case where the bit GDi is at a second logic level that is 1.

Note that the first to tenth auxiliary driving units DSX1 to DSX10 may be configured by noninverting buffers, and the logic levels of the bits GD1 to GD10 of the tone data GD [10:1] may be inverted and inputted to the first to tenth auxiliary driving units DSX1 to DSX10.

The reference voltage generating circuit 60 has resistance elements RD1 to RD1024 that cause resistance division between a node of a reset voltage VC (common voltage) and a node of a low-potential side power source VSS. The voltage range of the reference voltages VR1 to VR1024 obtained by the resistance division is from 7.5 V to 2.5 V.

The auxiliary voltage setting circuit 85 and the D/A conversion circuit 70 output 7.5 V with respect to the tone data GD [10:1]="000h", and output 2.5 V with respect to the tone data GD [10:1]="3FFh". For example, assuming that the gain of the inverting amplifier circuit AMIV is "−1", the output voltage range of the inverting amplifier circuit AMIV is 7.5 V to 12.5 V with respect to the output voltage range of 7.5 V to 2.5 V of the auxiliary voltage setting circuit 85 and the D/A conversion circuit 70.

According to the above-described embodiment, the driver 100 includes the voltage driving circuit 80, the D/A conversion circuit 70, the auxiliary capacitor driving circuit 84, and the auxiliary capacitor circuit 82. The voltage driving circuit 80 amplifies the voltage AMI of the input node NAMI, and outputs the amplified voltage as the data voltage to the data voltage output terminal TVQ. The D/A conversion circuit 70 selects a reference voltage corresponding to the tone data GD [10:1] from among the plurality of reference voltages VR1 to VR1024, and outputs the selected reference voltage to the input node NAMI of the voltage driving circuit 80. The auxiliary capacitor driving circuit 84 outputs first to tenth auxiliary capacitor driving voltages corresponding to the tone data GD [10:1] to the first to tenth auxiliary capacitor driving nodes NDS1 to NDS10. The auxiliary capacitor circuit 82 has first to tenth auxiliary capacitors CS1 to CS10 provided between the input node NAMI of the voltage driving circuit 80 and the first to tenth auxiliary capacitor driving nodes NDS1 to NDS10.

As described in the comparative example, the settling time of the output voltage of the D/A conversion circuit 70 is roughly determined by RC time constants of the resistance of the reference voltage generating circuit 60 and the parasitic capacitance of the input node NAMI. To shorten this settling time, the resistance value of the reference voltage generating circuit 60 needs to be lowered. However, there is a problem in that, if the resistance value is lowered, the current flowing through ladder resistors increases, and current consumption increases. In addition, if the resistance value of the reference voltage generating circuit 60 is excessively lowered, a voltage drop caused due to interconnect resistance increase, and for example, there is an issue that crosstalk occurs between channels via the reference voltage generating circuit 60.

In this regard, according to this embodiment, the voltage AMI of the input node NAMI of the voltage driving circuit 80 can be brought close to the output voltage of the D/A conversion circuit 70 quickly through charge redistribution between the auxiliary capacitor circuit 82 and the parasitic capacitance of the input node NAMI (and the balancing capacitor CSB). Although the settling time of the charge redistribution is roughly determined by the RC time constant, the settling time can be shortened by setting a small on-resistance of the switching circuit SWS, for example. Although there is an issue of an increase in current consumption or the like if the resistance of the reference voltage generating circuit 60 is reduced, an issue of the increase in current consumption or the like does not arise even if the on-resistance of the switching circuit SWS is reduced. Accordingly, higher-speed settling than with the D/A conversion circuit 70 can be achieved.

Also, in this embodiment, the driver 100 includes the capacitor driving circuit 20, the capacitor circuit 10, and the voltage driving circuit 80. The capacitor driving circuit 20 outputs first to tenth capacitor driving voltages (0 V or 15 V), corresponding to the tone data GD [10:1], to first to tenth capacitor driving nodes NDR1 to NDR10. The capacitor circuit 10 has the first to tenth capacitors C1 to C10 provided between the first to tenth capacitor driving nodes NDR1 to NDR10 and the data voltage output terminal TVQ. Then, after starting the capacitive driving that drives the electro-optical panel 200 using the capacitor driving circuit 20 and the capacitor circuit 10, the voltage driving circuit 80 carries out voltage driving that outputs the data voltage corresponding to the tone data GD [10:1] to the data voltage output terminal TVQ.

Because capacitive driving outputs data voltages through charge redistribution between capacitors as described in the comparative example, there are cases where the accuracy of the data voltages becomes lower than when using an amplifier circuit, which is capable of supplying charges freely. For example, an error occurs in the data voltage when a source line precharged as described above is connected to a data line.

With respect to this point, according to this embodiment, the data voltage is outputted by the voltage driving circuit 80 after the capacitive driving has been started, and thus highly-accurate data voltage output is possible. In other words, the output voltage VQ can quickly approach the data voltage through the capacitive driving, and highly-accurate data voltages can be written to pixels by then carrying out voltage driving.

As described above, although the charge at the data voltage output node NVQ is not (strictly speaking) conserved when the data line and source line of the electro-optical panel 200 are connected, a charge is supplied through the voltage driving, and thus the state can ultimately be restored to a state in which a charge is conserved. In other words, a charge is conserved before the source line is connected, and the data voltage output node NVQ is at the voltage SV1 at that time. After the voltage of the data line DL1 has become SV1' due to the source line SL1 being connected, returning that voltage to SV1 returns the charge to a state occurring prior to the connection of the source line, and the capacitive driving can be carried out thereafter as being in a state where a charge is conserved.

At this time, the voltage driving circuit 80 supplies one source line's worth of charge, and thus the supplied charge is lower than in the case of driving with a board capacitance, a data line capacitance, or the like. In other words, the charge supply capabilities can be reduced as compared to a case where the driving is carried out using an amplifier circuit from the beginning without using capacitive driving. As such, power consumption can be suppressed even in the case of a high-resolution electro-optical panel 200 that requires high-speed settling.

As described above, high-speed settling is made possible by using capacitive driving, and a higher-resolution electro-optical panel 200 can be driven than in the case where the driving uses only an amplifier circuit. In addition, combining capacitive driving and voltage driving makes it possible to drive pixels with highly-accurate data voltages while suppressing power consumption. At this time, although the settling time of the input voltage AMI (output voltage of the D/A conversion circuit 70) of the voltage driving circuit 80 affects the settling time in the voltage driving, provision of the auxiliary voltage setting circuit 85 enables the input voltage AMI to settle quickly.

In this embodiment, the capacitance of the ith auxiliary capacitor CSi of the first to tenth auxiliary capacitors CS1 to CS10 is smaller than the capacitor of the ith capacitor Ci in the first to tenth capacitors C1 to C10.

The electro-optical panel-side capacitance CP is very large, e.g., 50 pF to 120 pF. As compared therewith, the parasitic capacitance of the input node NAMI of the amplifier circuit AMVD (input gate capacitance of the amplifier circuit AMVD, interconnect capacitance of the node NAMI, and the like) is small. Because the ratio between the driving-side capacitance and the driven-side capacitance is 1:2, the capacitance of the auxiliary capacitor circuit 82, which drives a small driven-side capacitance, can be reduced. Because The RC time constant in the charge redistribution thereby becomes small, the input voltage AMI of the amplifier circuit AMVD can be driven quickly by the auxiliary voltage setting circuit 85.

In this embodiment, the auxiliary capacitor circuit 82 has the switching circuit SWS provided between the input node NAMI of the voltage driving circuit 80 and the first to tenth auxiliary capacitors CS1 to CS10.

As viewed from the output of the D/A conversion circuit 70, the auxiliary capacitor circuit 82 (and the balancing capacitor CSB) is seen as a load capacitance, and accordingly, the RC time constant of the output of the D/A conversion circuit 70 increases. For this reason, in the case where the voltage outputted by the auxiliary voltage setting circuit 85 and the voltage outputted by the D/A conversion circuit 70 are slightly different, the time taken for the input voltage AMI of the amplifier circuit AMVD to settle at the output of the D/A conversion circuit 70 will increase.

With respect to this point, according to this embodiment, the auxiliary capacitor circuit 82 (and the balancing capacitor CSB) can be disconnected from the input node NAMI of the amplifier circuit AMVD by turning off the switching circuit SWS. Thus, high-speed settling is enabled by the auxiliary voltage setting circuit 85 without increasing the time taken for the input voltage AMI of the amplifier circuit AMVD to settle at the output of the D/A conversion circuit 70.

In addition, in this embodiment, the switching circuit SWS turns off from an on state before the voltage driving circuit 80 starts voltage driving for outputting the data voltage to the data voltage output terminal TVQ.

Thus, by first turning on the switching circuit SWS to drive the input node NAMI quickly using the auxiliary voltage setting circuit 85, and thereafter turning off the switching circuit SWS, an increase in the RC time constant due to the auxiliary voltage setting circuit 85 can be avoided, and an accurate voltage can be supplied to the input node NAMI by the D/A conversion circuit 70. Then, by starting the voltage driving using the amplifier circuit AMVD after turning off the switching circuit SWS, the voltage driving can be carried out using an accurate voltage by the D/A conversion circuit 70.

In addition, in this embodiment, the voltage driving circuit 80 includes the amplifier circuit AMVD that outputs the data voltage, and the switching circuit SWAM provided between the output of the amplifier circuit AMVD and the data voltage output terminal TVQ. The switching circuit SWS of the auxiliary capacitor circuit 82 turns off from an on state before the voltage driving switching circuit SWAM turns on from an off state.

Because capacitive driving is faster than driving using the amplifier circuit AMVD, the output voltage VQ is pulled toward the output of the amplifier circuit AMVD and approaches the data voltage more slowly when voltage driving and capacitive driving are carried out simultaneously. With respect to this point, according to this embodiment, the switching circuit SWAM is provided, and thus the output of the amplifier circuit AMVD and the data voltage output terminal TVQ can be disconnected. In other words, after turning off the switching circuit SWAM in a first period (T1 in FIG. 7) to bring the output voltage close to a voltage near the data voltage quickly through the capacitive driving, the switching circuit SWAM is turned on in a second period (T2 in FIG. 7), and the highly-accurate output of the amplifier circuit AMVD can be connected to the data voltage output terminal TVQ. Thereby, both high-speed capacitive driving and highly-accurate amplifier driving can be achieved.

As a result of the switching circuit SWS of the auxiliary capacitor circuit 82 turning off from an on state before the voltage driving switching circuit SWAM turns on from an off state, the auxiliary capacitor circuit 82 can be disconnected from the output of the D/A conversion circuit 70 before the voltage driving is started.

In addition, as described in the modified configuration example, the voltage driving circuit 80 may be an inverting amplifier circuit. In this case, the auxiliary capacitor driving circuit 84 outputs the first to tenth auxiliary capacitor driving voltages corresponding to logically inverted data (data in which "0" and "1" of each bit are inverted respectively to "1" and "0") of the tone data GD [10:1].

Thus, the auxiliary voltage setting circuit 85 carries out inverting output (i.e., outputs a voltage in a voltage range from 7.5 V to 2.5 V, which is obtained by inverting the output range 7.5 V to 12.5 V in the capacitive driving with respect to the voltage VC=7.5 V). Accordingly, the voltage driving can be carried out using the inverting amplifier circuit.

In the inverting amplifier circuit, the voltage of a summing node (input voltage of a differential pair of the op-amp circuit) is fixed to a constant voltage (a voltage VC, for example). That is to say, because the input voltage of the differential pair does not change even at an end of the output range (12.5 V, for example), preferable characteristics (settling time, for example) can be easily obtained in a wider output range than with a noninverting amplifier circuit such as a voltage follower.

7. Third Example of Configuration of Driver

Next, consider again the data voltage in the first configuration example illustrated in FIG. 1. FIG. 2A assumes that the ratio between the capacitance CO of the capacitor circuit 10 and the electro-optical panel-side capacitance CP is set to 1:2, but a maximum value of the data voltage including cases where the ratio is not 1:2 will also be considered. As will be described hereinafter, if the driver 100 is to be created in a generic manner so as to be applicable in a variety of electro-optical panels 200, the ratio cannot be kept at 1:2, leading to a problem that the data voltage cannot be outputted in a constant range.

As illustrated in FIG. 9A, first, the capacitor circuit 10 is reset. In other words, "000h" is set for the tone data GD [10:1] (the h at the end indicates that the number within the "is a hexadecimal) and all of the outputs of the driving units DR1 to DR10 are set to 0 V. Meanwhile, the voltage VQ is set to VC=7.5 V, as indicated by Formula FA in FIG. 9A. In this reset, the entire charge accumulated in the capacitance CO of the capacitor circuit 10 and the electro-optical panel-side capacitance CP is conserved in the following data voltage output. Through this, data voltage that takes a reset voltage VC (a common voltage) as a reference is outputted.

As illustrated in FIG. 9B, the maximum value of the data voltage is outputted in the case where the tone data GD [10:1] is set to "3FFh" and the outputs of all of the driving units DR1 to DR10 are set to 15 V. The data voltage at this time can be found from the principle of the conservation of charge, and is a value indicated by Formula FB in FIG. 9B.

As illustrated in FIG. 9C, a desired data voltage range is assumed to be 5 V, for example. Because the reset voltage VC of 7.5 V is the reference, the maximum value is 12.5 V. This data voltage is realized when, based on the Formula FB, CO/(CO+CP)=⅓. In other words, relative to the electro-optical panel-side capacitance CP, the capacitance CO of the capacitor circuit 10 may be set to CP/2 (in other words, CP=2CO). The 5 V data voltage range can be realized by designing CO to be equal to CP/2 in this manner for a specific electro-optical panel 200 and a mounting board.

However, depending on the type of the electro-optical panel 200, the design of the mounting board, and so on, the electro-optical panel-side capacitance CP has a range of approximately 50 pF to 120 pF. Meanwhile, even with the same types of electro-optical panel 200 and mounting board, in the case where a plurality of electro-optical panels are connected (when connecting three R, G, and B electro-optical panels in a projector, for example), the lengths of wires for connecting the respective electro-optical panels to drivers differ, and thus the board capacitance CP1 will not necessary be the same.

For example, assume that the design is such that the capacitance CO of the capacitor circuit 10 for a given electro-optical panel 200 and mounting board is CP=2CO. In the case where a different type of electro-optical panel or mounting board is connected to this capacitor circuit 10, CP may become CO/2, 5CO, or the like. In the case where CP=CO/2, the maximum value of the data voltage will become 17.5 V, exceeding the power source voltage of 15 V, as illustrated in FIG. 9C. In this case, there is a problem not only in terms of the data voltage range but also in terms of the breakdown voltages of the driver 100, the electro-optical panel 200, and so on. Meanwhile, in the case where CP=5CO, the maximum value of the data voltage is 10 V, and thus a sufficient data voltage range cannot be achieved.

As such, in the case where the capacitance CO of the capacitor circuit 10 is set in accordance with the electro-optical panel-side capacitance CP, there is an issue that a dedicated design is necessary for the driver 100 with respect to the electro-optical panel 200, the mounting board, or the like. In other words, each time the type of the electro-optical panel 200, the design of the mounting board, or the like is changed, it is necessary to redesign the driver 100 specifically therefor.

Figure 10:
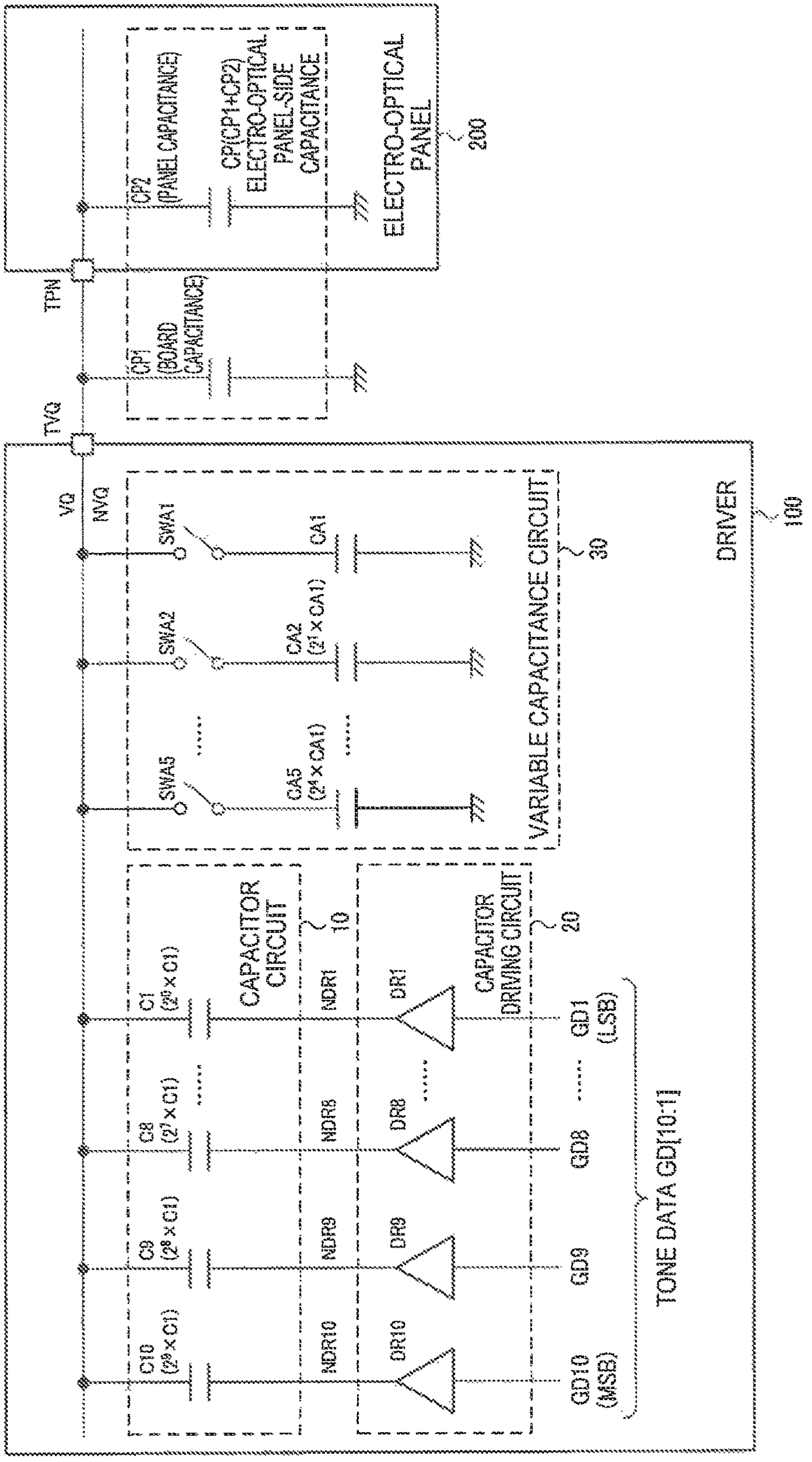
FIG. 10 illustrates a third example of the configuration of a driver.

FIG. 10 illustrates a third example of the configuration of a driver according to this embodiment, capable of solving the stated problem. This driver 100 includes the capacitor circuit 10, the capacitor driving circuit 20, and the variable capacitance circuit 30. Note that constituent elements that are the same as constituent elements already described are assigned the same reference numerals, and descriptions of those constituent elements are omitted as appropriate.

The variable capacitance circuit 30 is a circuit, serving as a capacitance connected to the data voltage output node NVQ, whose capacitance value can be set in a variable manner. Specifically, the variable capacitance circuit 30 includes first to mth switching elements SWA1 to SWAm (where m is a natural number of 2 or more), and first to mth adjusting capacitors CA1 to CAm. Note that the following will describe an example in which m=6.

The first to sixth switching elements SWA1 to SWA6 are configured as, for example, P-type or N-type MOS transistors, or as transfer gates that combine a P-type MOS transistor and an N-type MOS transistor. Of the switching elements SWA1 to SWA6, one end of an sth switching element SWAs (where s is a natural number no greater than m, which is 6) is connected to the data voltage output node NVQ.

The first to sixth adjusting capacitors CA1 to CA6 have capacitance values weighted by a power of 2. Specifically, of the adjusting capacitors CA1 to CA6, an sth adjusting capacitor CAs has a capacitance value of $2^{(s-1)}\times$CA1. One end of the sth adjusting capacitor CAs is connected to another end of the sth switching element SWAs. Another end of the sth adjusting capacitor CAs is connected to a low-potential side power source (broadly defined as a reference voltage node).

For example, in the case where CA1 is set to 1 pF, the capacitance of the variable capacitance circuit 30 is 1 pF while only the switching element SWA1 is on, whereas the capacitance of the variable capacitance circuit 30 is 63 pF (=1 pF+2 pF+ . . . +32 pF) while all the switching elements SWA1 to SWA6 are on. Because the capacitance values are weighted by a power of 2, the capacitance of the variable capacitance circuit 30 can be set from 1 pF to 63 pF in 1 pF (CA1) steps in accordance with whether the switching elements SWA1 to SWA6 are on or off.

8. Data Voltages in Third Configuration Example

Data voltages outputted by the driver 100 according to this embodiment will be described. Here, a range of the data voltages (a data voltage maximum value) will be described.

As illustrated in FIG. 11A, first, the capacitor circuit 10 is reset. In other words, the outputs of all the driving units DR1 to DR10 are set to 0 V and the voltage VQ is set to VC=7.5 V (Formula FC). In this reset, the entire charge accumulated in the capacitance CO of the capacitor circuit 10, a capacitance CA of the variable capacitance circuit, and the electro-optical panel-side capacitance CP is stored in the following data voltage output.

As illustrated in FIG. 11B, the maximum value of the data voltage is outputted in the case where the outputs of all of the driving units DR1 to DR10 are set to 15 V. The data voltage in this case is a value indicated by Formula FD in FIG. 11B.

As illustrated in FIG. 11C, a desired data voltage range is assumed to be 5 V, for example. The maximum value of 12.5 V for the data voltage is realized in the case where, from Formula FD, CO/(CO+(CA+CP))=⅓, or in other words, in the case where CA+CP=2CO. CA is the capacitance of the variable capacitance circuit, and can thus be set freely, which in turn means that the CA can be set to 2CO−CP for the provided CP. In other words, regardless of the type of the electro-optical panel 200 connected to the driver 100, the design of the mounting board, or the like, the data voltage range can always be set to 7.5 V to 12.5 V.

According to the third configuration example described thus far, the driver 100 includes the variable capacitance circuit 30. The variable capacitance circuit 30 is provided between the data voltage output terminal TVQ and a node at a reference voltage (the voltage of the low-potential side power source, namely 0 V). Then, the capacitance CA of the variable capacitance circuit 30 is set so that a capacitance CA+CP obtained by adding the capacitance CA of the variable capacitance circuit 30 and the electro-optical panel-side capacitance CP (this will be called a "driven-side capacitance" hereinafter) and the capacitance CO of the capacitor circuit 10 (this will be called a "driving-side capacitance" hereinafter) have a prescribed capacitance ratio relationship (CO:(CA+CP)=1:2, for example).

Here, the capacitance CA of the variable capacitance circuit 30 is a capacitance value set for the variable capacitance of the variable capacitance circuit 30. In the example of FIG. 10, this is obtained by taking the total of the capacitances of the adjusting capacitors connected to switching elements, of the switching elements SWA1 to SWA6, that are on. Meanwhile, the electro-optical panel-side capacitance CP is a capacitance externally connected to the data voltage output terminal TVQ (parasitic capacitance, circuit element capacitance). In the example illustrated in FIG. 10, this is the board capacitance CP1 and the panel capacitance CP2. Meanwhile, the capacitance CO of the capacitor circuit 10 is the total of the capacitances of the capacitors C1 to C10.

The prescribed capacitance ratio relationship refers to a relationship in a ratio between the driving-side capacitance CO and the driven-side capacitance CA+CP. This is not limited to a capacitance ratio in the case where the values of each capacitance are measured (where the capacitance values are explicitly determined). For example, the capacitance ratio may be estimated from the output voltage VQ for prescribed tone data GD [10:1]. The electro-optical panel-side capacitance CP is normally not a measured value obtained in advance, and thus the capacitance CA of the variable capacitance circuit 30 cannot be determined directly. Accordingly, as will be described later with reference to FIG. 14, the capacitance CA of the variable capacitance circuit 30 is determined so that, for example, a VQ of 10 V is outputted for a median value "200h" of the tone data GD [10:1]. In this case, the capacitance ratio is ultimately estimated as being CO:(CA+CP)=1:2, and the capacitance CP can be estimated from this ratio and the capacitance CA (can be estimated, but the capacitance CP need not be known).

In the first configuration example illustrated in FIG. 1 and the like, there is an issue in that a design change is necessary each time the connection environment of the driver 100 (the design of the mounting board, the type of the electro-optical panel 200, or the like) changes.

With respect to this point, according to the third configuration example, a generic driver 100 that does not depend on the connection environment of the driver 100 can be realized by providing the variable capacitance circuit 30. In other words, even in the case where the electro-optical panel-side capacitance CP is different, the prescribed capacitance ratio relationship (for example, CO:(CA+CP)=1:2) can be realized by adjusting the capacitance CA of the variable capacitance circuit 30 in accordance therewith. The data voltage range (7.5 V to 12.5 V in the example illustrated in FIGS.

11A to 11C) is determined by this capacitance ratio relationship, and thus a data voltage range that does not depend on the connection environment can be realized.

In addition, in this embodiment, the capacitor driving circuit 20 outputs the first voltage level (0 V) or the second voltage level (15 V) as driving voltages corresponding to the respective first to tenth capacitor driving voltages, based on the first to tenth bits GD1 to GD10 of the tone data GD [10:1]. The prescribed capacitance ratio relationship is determined by a voltage relationship between a voltage difference between the first voltage level and the second voltage level (15 V) and the data voltage outputted to the data voltage output terminal TVQ (the output voltage VQ).

In the example illustrated in FIGS. 11A to 11C, the range of data voltages outputted to the data voltage output terminal TVQ is 5 V (7.5 V to 12.5 V), for example. In this case, the prescribed capacitance ratio relationship is determined so that the voltage relationship is realized between the voltage difference between the first voltage level and the second voltage level (15 V) and the data voltage range (5 V). In other words, a capacitance ratio of CO:(CA+CP)=1:2 at which 15 V is divided to 5 V through voltage division by the capacitance CO and the capacitance CA+CP becomes the prescribed capacitance ratio relationship.

By doing so, the prescribed capacitance ratio relationship of CO:(CA+CP)=1:2 can be determined from the voltage relationship between the voltage difference between the first voltage level and the second voltage level (15 V) and the range of data voltages outputted to the data voltage output terminal TVQ (a range of 5 V). Conversely, whether or not the prescribed capacitance ratio relationship is realized can be determined by examining the voltage relationship. In other words, even if the electro-optical panel-side capacitance CP is not known, the capacitance CA of the variable capacitance circuit 30 at which the capacitance ratio of CO:(CA+CP)=1:2 is realized can be determined from the voltage relationship (the flow illustrated in FIG. 14, for example).

9. Detailed Example of Configuration of Driver

FIG. 12 illustrates a detailed example of the configuration of the driver according to this embodiment. This driver 100 includes a data line driving circuit 110, the reference voltage generation circuit 60, and the control circuit 40. The data line driving circuit 110 includes the auxiliary voltage setting circuit 85, the D/A conversion circuit 70, the voltage driving circuit 80, a capacitive driving circuit 90, and a detection circuit 50. The capacitive driving circuit 90 includes the capacitor circuit 10, the capacitor driving circuit 20, and the variable capacitance circuit 30. The control circuit 40 includes a data output circuit 42, an interface circuit 44, a variable capacitance control circuit 46, and a register unit 48. Note that constituent elements that are the same as constituent elements already described are assigned the same reference numerals, and descriptions of those constituent elements are omitted as appropriate.

A single data line driving circuit 110 is provided corresponding to a single data voltage output terminal TVQ. Although the driver 100 includes a plurality of data line driving circuits and a plurality of data voltage output terminals, only one is illustrated in FIG. 12. The reference voltage generation circuit 60 is provided in common for the plurality of data line driving circuits (a plurality of D/A conversion circuits).

The interface circuit 44 carries out an interfacing process between a display controller 300 (broadly defined as a processing unit) that controls the driver 100 and the driver 100. For example, the interfacing process is carried out through serial communication such as LVDS (Low Voltage Differential Signaling) or the like. In this case, the interface circuit 44 includes an I/O circuit that inputs/outputs serial signals and a serial/parallel conversion circuit that carries out serial/parallel conversion on control data, image data, and so on. Meanwhile, a line latch that latches the image data inputted from the display controller 300 and converted into parallel data is also included. The line latch latches image data corresponding to a single horizontal scanning line at one time, for example.

The data output circuit 42 extracts the tone data GD [10:1] to be outputted to the capacitor driving circuit 20 and the auxiliary capacitor driving circuit 84 from the image data corresponding to the horizontal scanning line, and outputs this data as data DQ[10:1]. This tone data GD [10:1] is outputted as data DQ2[10:1] to the D/A conversion circuit 70. The data output circuit 42 includes, for example, a timing controller that controls a driving timing of the electro-optical panel 200, a selection circuit that selects the tone data GD [10:1] from the image data corresponding to the horizontal scanning line, an output latch that latches the selected tone data GD [10:1] as the data DQ[10:1], and an output latch that latches the selected tone data GD [10:1] as the data DQ2 [10:1]. As will be described later with reference to FIG. 19 and so on, in the case of phase expansion driving, the output latch latches eight pixels' worth of the tone data GD [10:1] (equivalent to the number of data lines DL1 to DL8) at one time. In this case, the timing controller controls the operational timing of the selection circuit, the output latch, and so on in accordance with the driving timing of the phase expansion driving. Meanwhile, a horizontal synchronization signal, a vertical synchronization signal, and so on may be generated based on the image data received by the interface circuit 44. Furthermore, a signal (ENBX) for controlling the switching elements (SWEP1 and the like) in the electro-optical panel 200 on and off, a signal for controlling gate driving (selection of horizontal scanning lines in the electro-optical panel 200), and so on may be outputted to the electro-optical panel 200.

The detection circuit 50 detects the voltage VQ at the data voltage output node NVQ. Specifically, the detection circuit 50 compares a prescribed detection voltage with the voltage VQ and outputs a result thereof as a detection signal DET. For example, DET="1" is outputted in the case where the voltage VQ is greater than or equal to the detection voltage, and DET="0" is outputted in the case where the voltage VQ is less than the detection voltage.

The variable capacitance control circuit 46 sets the capacitance of the variable capacitance circuit 30 based on the detection signal DET. The flow of this setting process will be described later with reference to FIG. 14. The variable capacitance control circuit 46 outputs a setting value CSW[6:1] as a control signal for the variable capacitance circuit 30. This setting value CSW[6:1] is constituted of first to sixth bits CSW6 to CSW1 (first to mth bits). A bit CSWs (where s is a natural number no greater than m, which is 6) is inputted into the switching element SWAs of the variable capacitance circuit 30. For example, in the case where the bit CSWs="0", the switching element SWAs turns off, whereas in the case where the bit CSWs="1", the switching element SWAs turns on. In the case where the setting process is carried out, the variable capacitance control circuit 46 outputs detection data BD[10:1]. Then, the data output circuit 42 outputs the detection data BD[10:1] to the capacitor driving circuit 20 as the output data DQ[10:1].

The register unit 48 stores the setting value CSW[6:1] of the variable capacitance circuit 30 set through the setting process. The register unit 48 is configured to be accessible from the display controller 300 via the interface circuit 44. In other words, the display controller 300 can read out the setting value CSW[6:1] from the register unit 48. Alternatively, the configuration may be such that the display controller 300 can write the setting value CSW[6:1] into the register unit 48.

Figure 13:
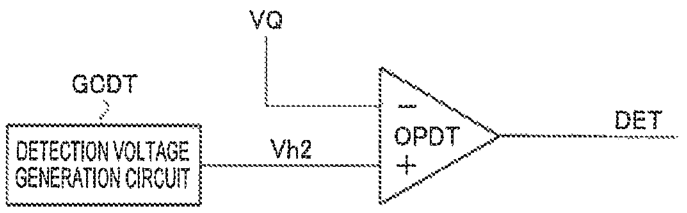
FIG. 13 illustrates an example of the detailed configuration of a detection circuit.

FIG. 13 illustrates an example of the detailed configuration of the detection circuit 50. The detection circuit 50 includes a detection voltage generation circuit GCDT that generates a detection voltage Vh2 and a comparator OPDT that compares the voltage VQ at the data voltage output node NVQ with the detection voltage Vh2.

The detection voltage generation circuit GCDT outputs the detection voltage Vh2, which is determined in advance by a voltage division circuit or the like using a resistance element, for example. Alternatively, a variable detection voltage Vh2 may be outputted through register settings or the like. In this case, the detection voltage generation circuit GCDT may be a D/A conversion circuit that D/A-converts a register setting value.

10. Process for Setting Capacitance of Variable Capacitance Circuit

Figure 14:
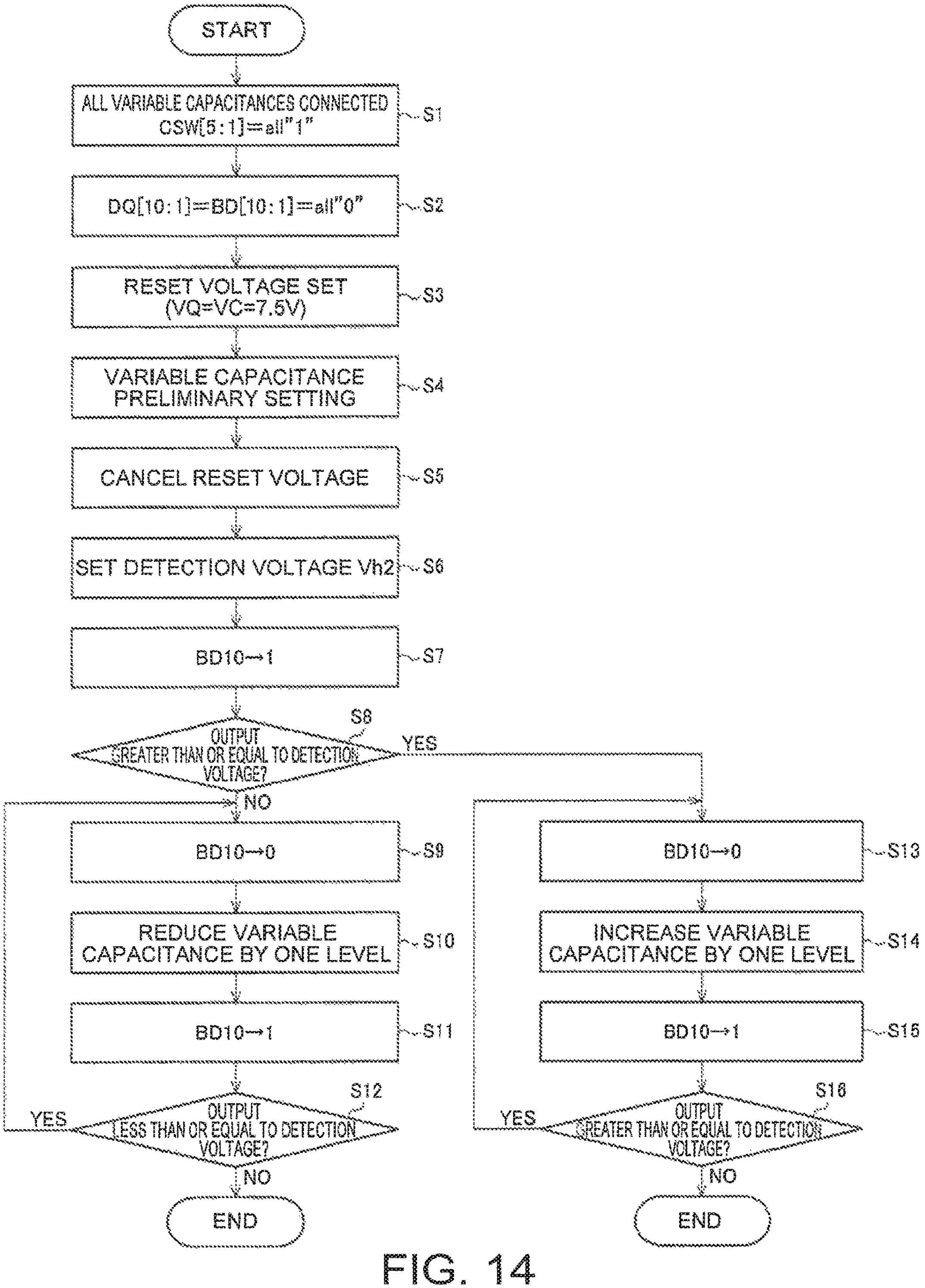
FIG. 14 is a flowchart illustrating a process for setting a capacitance of a variable capacitance circuit.

FIG. 14 is a flowchart illustrating a process for setting the capacitance of the variable capacitance circuit 30. This process is carried out, for example, during startup (an initialization process) when the power of the driver 100 is turned on.

As illustrated in FIG. 14, when the process starts, the setting value CSW[6:1] of "3Fh" is outputted, and all of the switching elements SWA1 to SWA6 of the variable capacitance circuit 30 are turned on (step S1). Next, the detection data BD[10:1] of "000h" is outputted, and the outputs of all of the driving units DR1 to DR10 of the capacitor driving circuit 20 are set to 0 V (step S2). Next, the output voltage VQ is set to the reset voltage VC of 7.5 V (step S3). This reset voltage VC is supplied, for example, from the exterior via the terminal TVC, which will be described later with reference to FIG. 16.

Next, the capacitance of the variable capacitance circuit 30 is preliminarily set (step S4). For example, the setting value CSW[6:1] is set to "1Fh". In this case, the switching element SWA6 turns off and the switching elements SWA5 to SWA1 turn on, and thus the capacitance is half the maximum value. Next, the supply of the reset voltage VC to the output voltage VQ is canceled (step S5). Then, the detection voltage Vh2 is set to a desired voltage (step S6). For example, the detection voltage Vh2 is set to 10 V.

Next, the MSB of the detection data BD[10:1] is changed from BD10="0" to BD10="1" (step S7). Then, it is detected whether or not the output voltage VQ is greater than or equal to the detection voltage Vh2 of 10 V (step S8).

In the case where the output voltage VQ is less than the detection voltage Vh2 of 10 V in step S8, the bit BD10 is returned to "O" (step S9). Next, 1 is subtracted from the setting value CSW[6:1] of "1Fh" for "1Eh" and the capacitance of the variable capacitance circuit 30 is lowered by one level (step S10). Next, the bit BD10 is set to "1" (step S11). Then, it is detected whether or not the output voltage VQ is less than or equal to the detection voltage Vh2 of 10 V (step S12). The process returns to step S9 in the case where the output voltage VQ is less than or equal to the detection voltage Vh2 of 10 V, and the process ends in the case where the output voltage VQ is greater than the detection voltage Vh2 of 10 V.

In the case where the output voltage VQ is greater than or equal to the detection voltage Vh2 of 10 V in step S8, the bit BD10 is returned to "O" (step S13). Next, 1 is added to the setting value CSW[6:1] of "1Fh" for "20h" and the capacitance of the variable capacitance circuit 30 is raised by one level (step S14). Next, the bit BD10 is set to "1" (step S15). Then, it is detected whether or not the output voltage VQ is greater than or equal to the detection voltage Vh2 of 10 V (step S16). The process returns to step S13 in the case where the output voltage VQ is greater than or equal to the detection voltage Vh2 of 10 V, and the process ends in the case where the output voltage VQ is less than the detection voltage Vh2 of 10 V.

FIGS. 15A and 15B schematically illustrate the setting value CSW[6:1] being determined through the stated steps S8 to S16.

In the aforementioned flow, the MSB of the detection data BD[10:1] is set to BD10="1", and the output voltage VQ at that time is compared to the detection voltage Vh2 of 10 V. BD[10:1]="200h" is a median value of the tone data range "000h" to "3FFh", and the detection voltage Vh2 of 10 V is a median value of the data voltage range of 7.5 V to 12.5 V. In other words, if the output voltage VQ matches the detection voltage Vh2 of 10 V when BD10="1", the correct (desired) data voltage is obtained.

As illustrated in FIG. 15A, in the case of "NO" in step S8 for the preliminary setting value CSW[6:1]="1Fh", VQ<Vh2. In this case, it is necessary to raise the output voltage VQ. From Formula FD in FIG. 11B, it can be seen that the output voltage VQ will rise if the capacitance CA of the variable capacitance circuit 30 is reduced, and thus the setting value CSW[6:1] is reduced by "1" at a time. The setting value CSW[6:1] stops at "1Ah", where VQ Vh2 for the first time. Through this, the setting value CSW[6:1] at which the output voltage VQ nearest to the detection voltage Vh2 is obtained can be determined.

As illustrated in FIG. 15B, in the case of "YES" in step S8 for the preliminary setting value CSW[6:1]="1Fh", VQ≥Vh2. In this case, it is necessary to lower the output voltage VQ. From Formula FD in FIG. 11B, it can be seen that the output voltage VQ will drop if the capacitance CA of the variable capacitance circuit 30 is increased, and thus the setting value CSW[6:1] is increased by "1" at a time. The setting value CSW[6:1] stops at "24h", where VQ<Vh2 for the first time. Through this, the setting value CSW[6:1] at which the output voltage VQ nearest to the detection voltage Vh2 is obtained can be determined.

The setting value CSW[6:1] obtained through the above processing is determined as the final setting value CSW[6:1], and that setting value CSW[6:1] is written into the register unit 48. When driving the electro-optical panel 200 through capacitive driving, the capacitance of the variable capacitance circuit 30 is set using the setting value CSW[6:1] stored in the register unit 48.

Although this embodiment describes an example in which the setting value CSW[6:1] of the variable capacitance circuit 30 is stored in the register unit 48, the invention is not limited thereto. For example, the setting value CSW[6:1] may be stored in a memory such as a RAM or the like, or the setting value CSW[6:1] may be set using a fuse (for example, setting the setting value through cutting by a laser or the like during manufacture).

11. Second Detailed Example of Configuration of Driver

Figure 16:
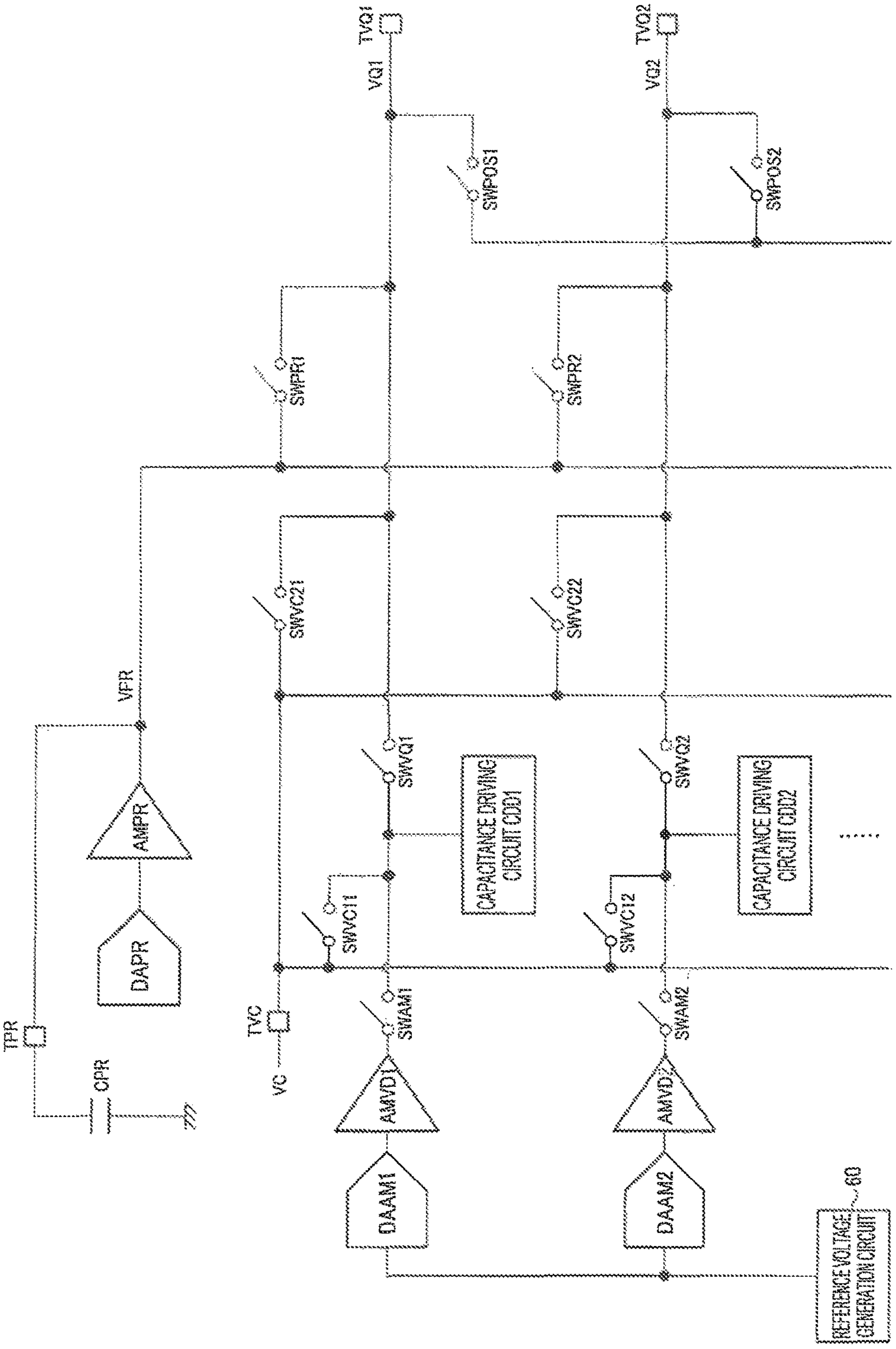
FIG. 16 illustrates a second example of the detailed configuration of a driver.

FIG. 16 illustrates a second example of the detailed configuration of the driver 100 according to this embodiment. Note that the auxiliary voltage setting circuit 85 is not shown here.

The driver 100 includes: amplifier circuits AMVD1 and AMVD2; D/A conversion circuits DAAM1 and DAAM2;

switching circuits SWAM1 and SWAM2; the reference voltage generation circuit 60; a precharge terminal TPR; the reset voltage terminal TVC (a common voltage terminal); data voltage output terminals TVQ1 and TVQ2; a precharge D/A conversion circuit DAPR; a precharge amplifier circuit AMPR; capacitive driving circuits CDD1 and CDD2; precharge switching elements SWPR1 and SWPR2; reset switching elements SWVC11, SWVC12, SWVC21, and SWVC22; output switching elements SWVQ1 and SWVQ2; and postcharge switching elements SWPOS1 and SWPOS2.

The capacitive driving circuit CDD1, the D/A conversion circuit DAAM1, the amplifier circuit AMVD1, and the switching circuit SWAM1 correspond to the data line driving circuit 110 illustrated in FIG. 12. Likewise, the capacitive driving circuit CDD2, the D/A conversion circuit DAAM2, the amplifier circuit AMVD2, and the switching circuit SWAM2 correspond to the data line driving circuit 110 illustrated in FIG. 12. Although only two are illustrated in FIG. 16, in reality, the driver 100 has the same number (or more) of data line driving circuits as there are data lines in the electro-optical panel 200. Likewise, the numbers of data voltage output terminals, various types of switching elements, and so on are the same as the number of data line driving circuits.

The reset voltage VC (common voltage) is supplied to the reset voltage terminal TVC from an external power source circuit or the like, for example.

Note that the method for supplying the reset voltage VC is not limited to the reset voltage terminal TVC. For example, the driver 100 may include a reset voltage amplifier circuit that outputs the reset voltage VC.

The precharge terminal TPR is connected to an output of the precharge amplifier circuit AMPR. The precharge D/A conversion circuit DAPR D/A-converts a precharge setting value (a register value, for example) and generates the precharge voltage VPR, and the precharge amplifier circuit AMPR drives the precharge terminal TPR using the precharge voltage VPR. The precharge voltage VPR is a voltage that is lower than the reset voltage VC, for example (within a data voltage range of 7.5 V to 2.5 V in negative-polarity driving).

An external precharge capacitor CPR is connected to the precharge terminal TPR. The precharge capacitor CPR accumulates a charge corresponding to the precharge voltage VPR, and supplies the charge to the data line during a precharge. The precharge voltage VPR can be smoothed by providing the precharge capacitor CPR, and thus the charge supply performance of the precharge amplifier circuit AMPR can be reduced. In other words, although the precharge capacitor CPR emits a charge when the precharge is carried out, it is sufficient that the precharge amplifier circuit AMPR can replenish the charge in the precharge capacitor CPR before the next precharge is carried out.

Figure 17:
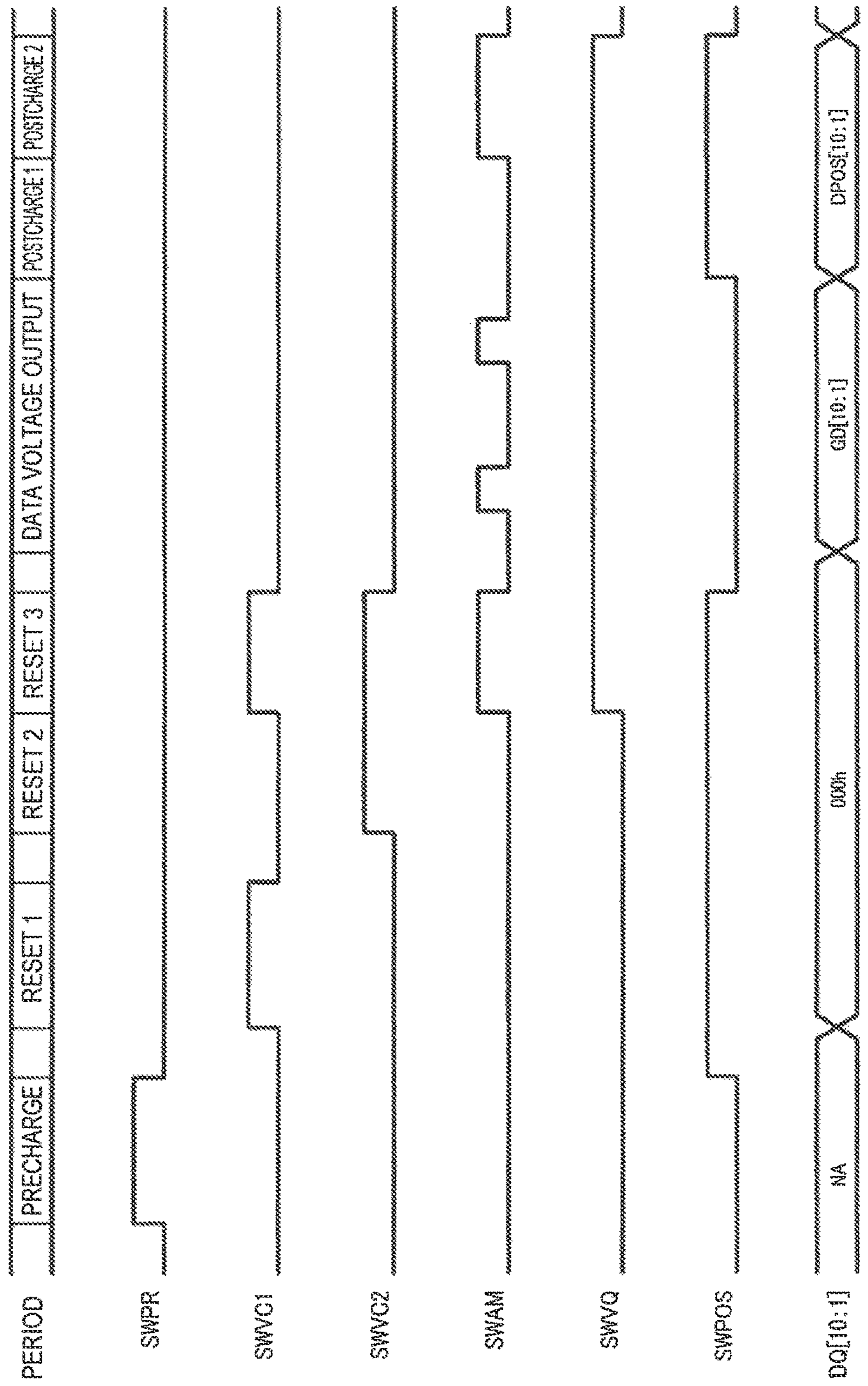
FIG. 17 is an operational timing chart of the second detailed configuration example.

FIG. 17 is an operational timing chart of the second detailed example of the configuration of the driver 100. In FIG. 17, numbers at the ends of the reference numerals of the switching element have been omitted. For example, "SWPR" indicates the precharge switching elements SWPR1 and SWPR2. In the timing chart for the switching elements, high-level indicates a state in which a switching element is on, and low-level indicates a state in which the switching element is off.

As illustrated in FIG. 17, the driving of the electro-optical panel 200 is carried out in the order of precharge, reset, data voltage output, and postcharge. This series of operations is carried out in a single horizontal scanning period, for example.

In a precharge period, the precharge switching elements SWPR1 and SWPR2 turn on, and the precharge voltage VPR is outputted from the data voltage output terminals TVQ1 and TVQ2.

A reset period is divided into first to third reset periods. In the first to third reset periods, DQ[10:1] is set to "000h" (DQ2[10:1]="000h"), and the driving units DR1 to DR10 of the capacitor driving circuit 20 all output 0 V. The amplifier circuits AMVD1 and AMVD2 output the reset voltage VC.

In the first reset period, the reset switching elements SWVC11 and SWVC12 turn on, and the outputs of the capacitive driving circuits CDD1 and CDD2 (one end of the capacitors C1 to C10) are set to the reset voltage VC. Through this, the charges in the capacitor circuit 10 and the variable capacitance circuit 30 are reset. Meanwhile, the postcharge switching elements SWPOS1 and SWPOS2 turn on, and the data voltage output terminals TVQ1 and TVQ2 are connected in common.

In the second reset period, the reset switching elements SWVC21 and SWVC22 and the postcharge switching elements SWPOS1 and SWPOS2 turn on, and the reset voltage VC is outputted from the data voltage output terminals TVQ1 and TVQ2. Through this, the charge in the electro-optical panel-side capacitance CP is reset.

In the third reset period, the output switching elements SWVQ1 and SWVQ2 and the switching circuits SWAM1 and SWAM2 turn on; an output of the amplifier circuit AMVD1, an output of the capacitive driving circuit CDD1, and the data voltage output terminal TVQ1 are connected; and an output of the amplifier circuit AMVD2, an output of the capacitive driving circuit CDD2, and the data voltage output terminal TVQ2 are connected. In addition, the reset switching elements SWVC11, SWVC12, SWVC21, and SWVC22 and the postcharge switching elements SWPOS1 and SWPOS2 turn on, and the reset voltage VC is outputted from the data voltage output terminals TVQ1 and TVQ2.

In a data voltage output period, DQ[10:1] is set to GD[10:1] (DQ2[10:1] is set to GD[10:1]). Then, the output switching elements SWVQ1 and SWVQ2 turn on, and data voltages corresponding to the tone data GD [10:1] are outputted from the data voltage output terminals TVQ1 and TVQ2. Details of the data voltage output period will be given later.

A postcharge period is divided into a first postcharge period and a second postcharge period. In the first postcharge period and the second postcharge period, DQ[10:1] is set to DPOS[10:1] (DQ2[10:1] is set to DPOS[10:1]). DPOS[10:1] is postcharge data.

In the first postcharge period, the output switching elements SWVQ1 and SWVQ2 and the postcharge switching elements SWPOS1 and SWPOS2 turn on, and a data voltage corresponding to the postcharge data DPOS[10:1] is outputted from the data voltage output terminals TVQ1 and TVQ2.

In the second postcharge period, the switching circuits SWAM1 and SWAM2 also turn on, and the amplifier circuits AMVD1 and AMVD2 output a data voltage corresponding to the postcharge data DPOS[10:1] to the data voltage output terminals TVQ1 and TVQ2.

Figure 18:
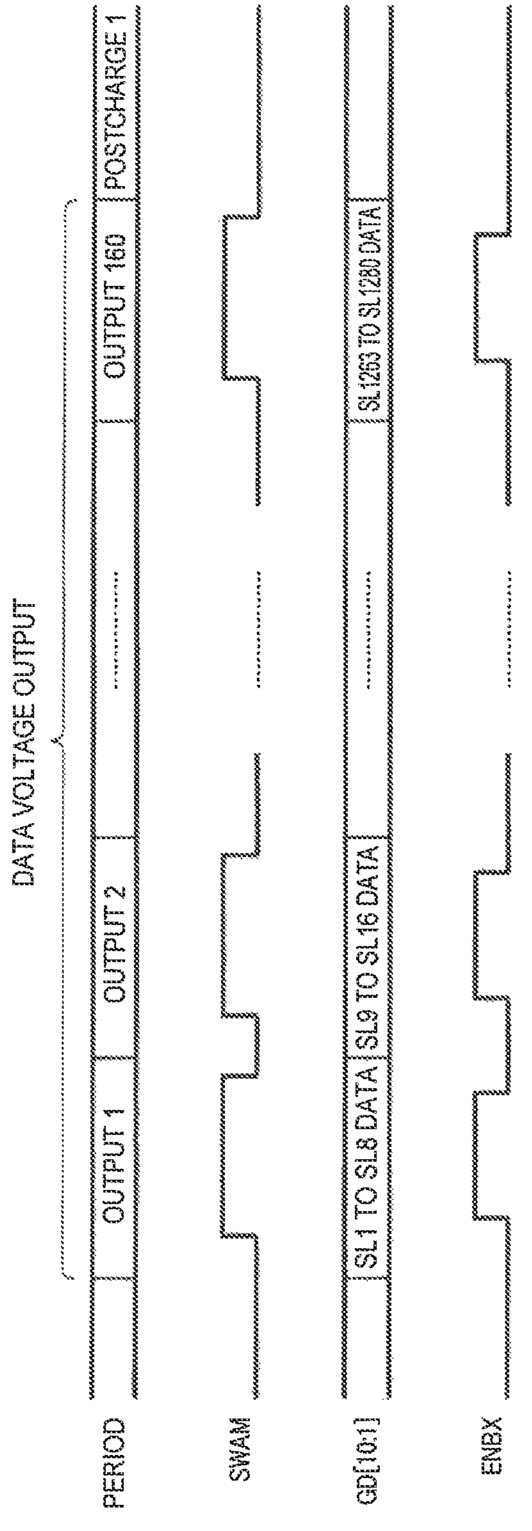
FIG. 18 is an operational timing chart of the second detailed configuration example.

FIG. 18 is an operational timing chart illustrating the data voltage output period. The data voltage output period is divided into first to 160th output periods. Note that the following describes an example in which the electro-optical panel 200 has the configuration illustrated in FIG. 19.

In the first output period, tone data corresponding to the source lines SL1 to SL8 is outputted as the tone data GD [10:1]. For example, a timing at which the tone data is latched by the output latch of the data output circuit 42 corresponds to the timing when capacitive driving starts. The switching circuits SWAM1 and SWAM2 turn on after the tone data corresponding to the source lines SL1 to SL8 has been latched, and the amplifier circuits AMVD1 and AMVD2 output data voltages corresponding to the tone data.

The signal ENBX is on (active) in the period the switching circuits SWAM1 and SWAM2 are on (a voltage driving period), and the source lines SL1 to SL8 of the electro-optical panel 200 are driven. The signal ENBX is a control signal for controlling the switching elements that connect the data lines and source lines in the electro-optical panel 200 to turn on and off.

After the switching circuits SWAM1 and SWAM2 have turned off, the following second output period is transited to. In the second output period, tone data corresponding to the source lines SL9 to SL16 is outputted as the tone data GD [10:1]. Next, the switching circuits SWAM1 and SWAM2 turn on, the signal ENBX turns on (active), and the source lines SL9 to SL16 of the electro-optical panel 200 are driven. Corresponding operations are carried out in the third to 160th output periods, and the first postcharge period is then transited to.

12. Phase Expansion Driving Method

Next, a method of driving the electro-optical panel 200 will be described. The following describes an example of phase expansion driving, but the method of driving carried out by the driver 100 in this embodiment is not limited to phase expansion driving.

Figure 19:
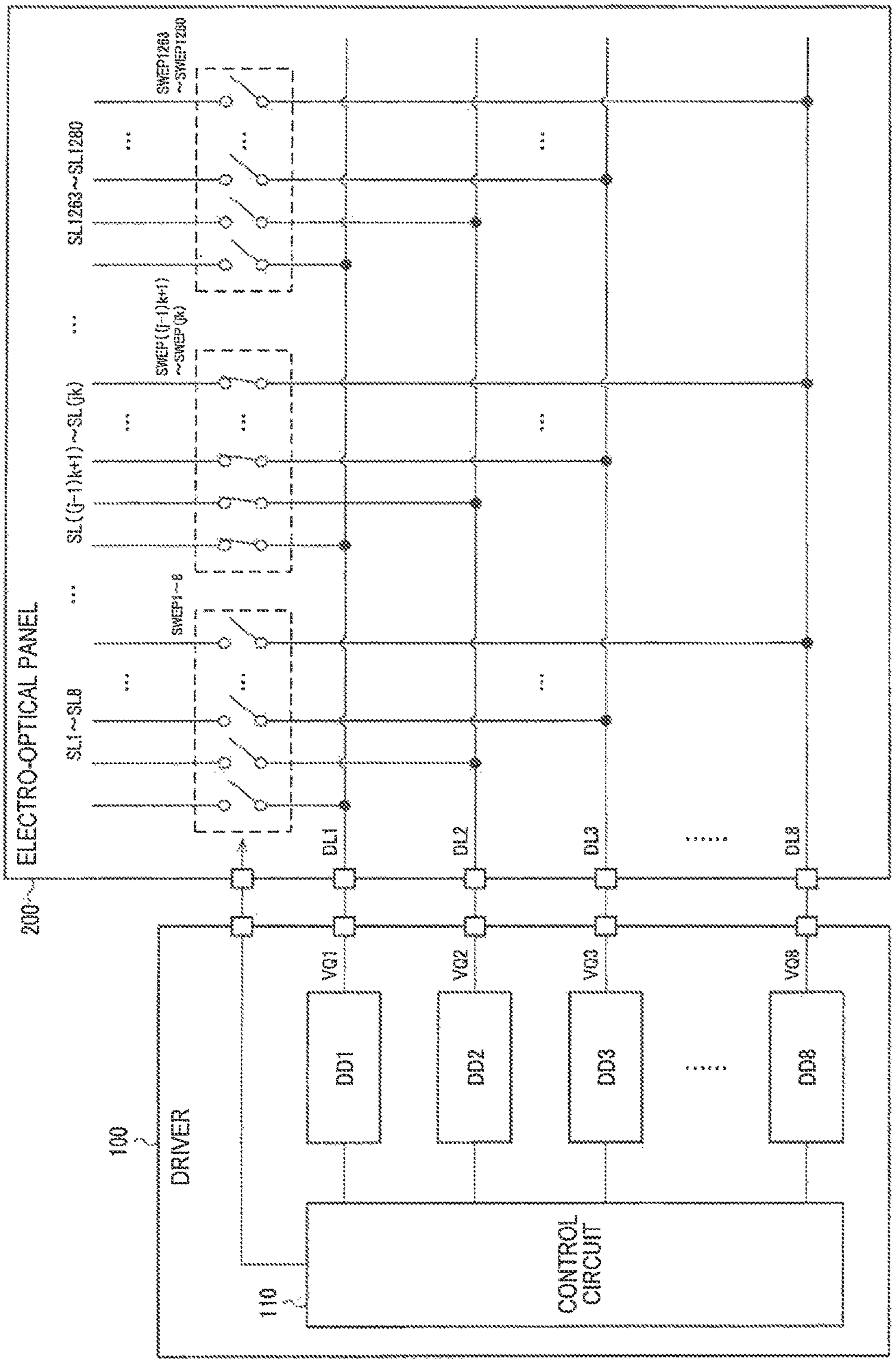
FIG. 19 illustrates a third example of the detailed configuration of a driver, an example of the detailed configuration of an electro-optical panel, and an example of the configuration of connections between the driver and the electro-optical panel.

FIG. 19 illustrates a third example of the detailed configuration of a driver, an example of the detailed configuration of an electro-optical panel, and an example of the configuration of connections between the driver and the electro-optical panel.

The driver 100 includes the control circuit 40 and first to kth data line driving circuits DD1 to DDk (where k is a natural number of 2 or more). The data line driving circuits DD1 to DDk each correspond to the data line driving circuit 110 illustrated in FIG. 12. Note that the following will describe an example in which k=8.

The control circuit 40 outputs corresponding tone data to each data line driving circuit in the data line driving circuits DD1 to DD8. The control circuit 40 also outputs a control signal (for example, ENBX illustrated in FIG. 20 or the like) to the electro-optical panel 200.

The data line driving circuits DD1 to DD8 convert the tone data into data voltages, and output those data voltages to the data lines DL1 to DL8 of the electro-optical panel 200 as output voltages VQ1 to VQ8.

The electro-optical panel 200 includes the data lines DL1 to DL8 (first to kth data lines), switching elements SWEP1 to SWEP(tk), and source lines SL1 to SL(tk). t is a natural number of 2 or more, and the following will describe an example in which t=160 (in other words, tk=160×8=1,280 (WXGA)).

Of the switching elements SWEP1 to SWEP1280, one end of each of the switching elements SWEP((j−1)×k+1) to SWEP(j×k) is connected to the data lines DL1 to DL8. j is a natural number no greater than t, which is 160. For example, in the case where j=1, the switching elements are SWEP1 to SWEP8.

The switching elements SWEP1 to SWEP1280 are constituted of TFTs (Thin Film Transistors) or the like, for example, and are controlled based on control signals from the driver 100. For example, the electro-optical panel 200 includes a switching control circuit (not shown), and that switching control circuit controls the switching elements SWEP1 to SWEP1280 to turn on and off based on a control signal such as ENBX.

Figure 20:
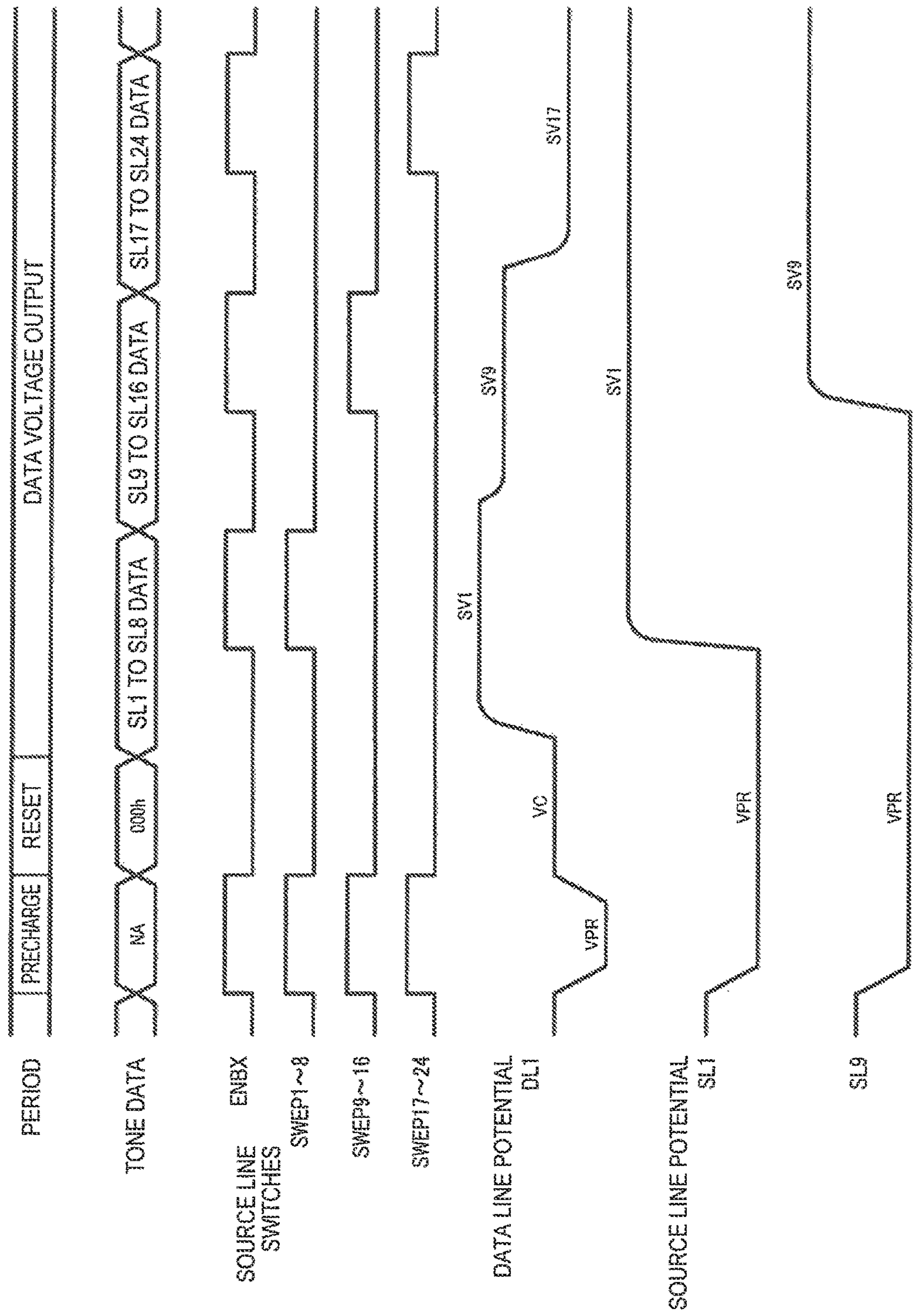
FIG. 20 is an operational timing chart of a driver and an electro-optical panel.

FIG. 20 is an operational timing chart of the driver 100 and the electro-optical panel 200 illustrated in FIG. 19.

In the precharge period, the signal ENBX goes to high-level, and all of the switching elements SWEP1 to SWEP1280 turn on. Then, all of the source lines SL1 to SL1280 are set to the precharge voltage VPR.

In the reset period, the signal ENBX goes to low-level, and the switching elements SWEP1 to SWEP1280 all turn off. The data lines DL1 to DL8 are then set to the reset voltage VC of 7.5 V. The source lines SL1 to SL1280 remain at the precharge voltage VPR.

In a first output period in the data voltage output period, the tone data corresponding to the source lines SL1 to SL8 are inputted into the data line driving circuits DD1 to DD8. Then, capacitive driving is carried out by the capacitor circuit 10 and the capacitor driving circuit 20 and voltage driving is carried out by the voltage driving circuit 80, and the data lines DL1 to DL8 are driven by the data voltages SV1 to SV8. After the capacitive driving and voltage driving start, the signal ENBX goes to high-level, and the switching elements SWEP1 to SWEP8 turn on. Then, the source lines SL1 to SL8 are driven by the data voltages SV1 to SV8. At this time, a single gate line (horizontal scanning line) is selected by a gate driver (not shown), and the data voltages SV1 to SV8 are written into the pixel circuits connected to the selected gate line and the data lines DL1 to DL8. Note that FIG. 20 illustrates potentials of the data line DL1 and the source line SL1 as examples.

In a second output period, the tone data corresponding to the source lines SL9 to SL16 are inputted into the data line driving circuits DD1 to DD8. Then, capacitive driving is carried out by the capacitor circuit 10 and the capacitor driving circuit 20 and voltage driving is carried out by the voltage driving circuit 80, and the data lines DL1 to DL8 are driven by the data voltages SV9 to SV16. After the capacitive driving and voltage driving start, the signal ENBX goes to high-level, and the switching elements SWEP9 to SWEP16 turn on. Then, the source lines SL9 to SL16 are driven by the data voltages SV9 to SV16. At this time, the data voltages SV9 to SV16 are written into the pixel circuits connected to the selected gate line and the data lines DL9 to DL16. Note that FIG. 20 illustrates potentials of the data line DL1 and the source line SL9 as examples.

Thereafter, the source lines SL17 to SL24, SL25 to SL32, . . . , and SL1263 to SL1280 are driven in the same manner in a third output period, a fourth output period, . . . , and a 160th output period, after which the process moves to the postcharge period.

13. Electronic Device

Figure 21:
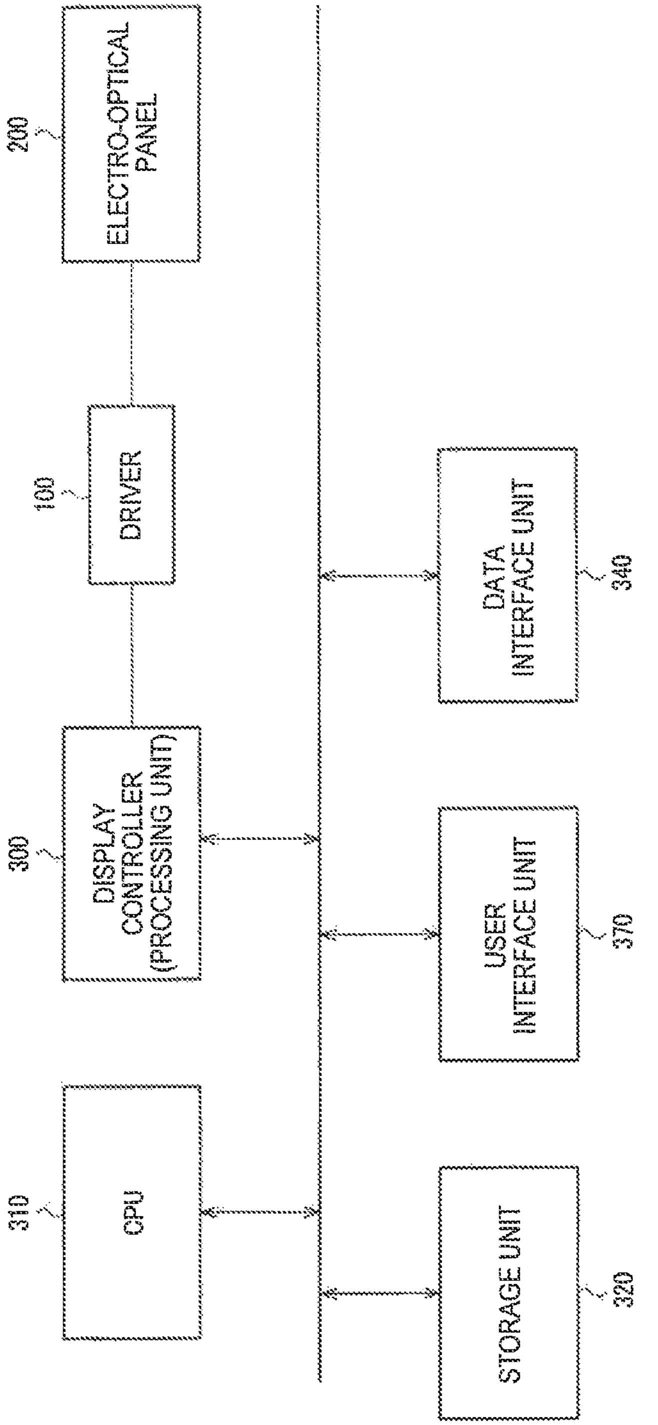
FIG. 21 illustrates an example of the configuration of an electronic device.

FIG. 21 illustrates an example of the configuration of an electronic device in which the driver 100 according to this embodiment can be applied. A variety of electronic devices provided with display devices can be considered as the electronic device according to this embodiment, including a projector, a television device, an information processing apparatus (a computer), a mobile information terminal, a car navigation system, a mobile gaming terminal, and so on, for example.

The electronic device illustrated in FIG. 21 includes the driver 100, the electro-optical panel 200, the display controller 300 (a first processing unit), a CPU 310 (a second processing unit), a storage unit 320, a user interface unit 330, and a data interface unit 340.

The electro-optical panel 200 is a matrix-type liquid-crystal display panel, for example. Alternatively, the electro-optical panel 200 may be an EL (Electro-Luminescence) display panel using selfluminous elements. The user interface unit 330 is an interface unit that accepts various operations from a user. The user interface unit 330 is constituted of buttons, a mouse, a keyboard, a touch panel with which the electro-optical panel 200 is equipped, or the like, for example. The data interface unit 340 is an interface unit that inputs and outputs image data, control data, and the like. For example, the data interface unit 340 is a wired communication interface such as USB, a wireless communication interface such as a wireless LAN, or the like. The storage unit 320 stores image data inputted from the data interface unit 340. Alternatively, the storage unit 320 functions as a working memory for the CPU 310, the display controller 300, or the like. The CPU 310 carries out control processing for the various units in the electronic device, various types of data processing, and so on. The display controller 300 carries out control processing for the driver 100. For example, the display controller 300 converts image data transferred from the data interface unit 340, the storage unit 320, or the like into a format that can be handled by the driver 100, and outputs the converted image data to the driver 100. The driver 100 drives the electro-optical panel 200 based on the image data transferred from the display controller 300.

Although the foregoing has described embodiments of the invention in detail, one skilled in the art will easily recognize that many variations can be made thereon without departing from the essential spirit of the novel items and effects of the invention. Such variations should therefore be taken as being included within the scope of the invention. For example, in the specification or drawings, terms denoted at least once along with terms that have broader or the same definitions as those terms ("low-level" and "high-level" for "first logic level" and "second logic level", respectively) can be replaced with those terms in all areas of the specification or drawings. Furthermore, all combinations of the embodiments and variations fall within the scope of the invention. Finally, the configurations and operations of the capacitor circuit, capacitor driving circuit, variable capacitance circuit, detection circuit, control circuit, reference voltage generation circuit, D/A conversion circuit, voltage driving circuit, auxiliary voltage setting circuit, driver, electro-optical panel, and electronic device are not limited to those described in the embodiments, and many variations can be made thereon.

The entire disclosure of Japanese Patent Application No. 2014-226884, filed Nov. 7, 2014 is expressly incorporated by reference herein.

What is claimed is:

1. A driver comprising:

a voltage driving circuit that amplifies a voltage of an input node and outputs the amplified voltage as a data voltage to a data voltage output terminal;

a D/A conversion circuit that selects a reference voltage corresponding to tone data from among a plurality of reference voltages, and outputs the selected reference voltage to the input node of the voltage driving circuit;

an auxiliary capacitor driving circuit that outputs first to nth auxiliary capacitor driving voltages (n is a natural number of 2 or more) corresponding to the tone data to first to nth auxiliary capacitor driving nodes; and an auxiliary capacitor circuit having first to nth auxiliary capacitors provided between the input node of the voltage driving circuit and the first to nth auxiliary capacitor driving nodes, the auxiliary capacitor circuit outputting a voltage separately from the output of the selected reference voltage by the D/A conversion circuit, wherein the voltage output by the auxiliary capacitor circuit is not output by the D/A conversion circuit.

2. The driver according to claim 1, further comprising:

a capacitor driving circuit that outputs first to nth capacitor driving voltages corresponding to the tone data to first to nth capacitor driving nodes; and a capacitor circuit having first to nth capacitors provided between the first to nth capacitor driving nodes and the data voltage output terminal, wherein after capacitive driving for driving an electro-optical panel is started by the capacitor driving circuit and the capacitor circuit, the voltage driving circuit carries out voltage driving for outputting the data voltage to the data voltage output terminal.

3. The driver according to claim 2, wherein a capacitance of an ith auxiliary capacitor (i is a natural number no greater than n) in the first to nth auxiliary capacitors is smaller than a capacitance of an ith capacitor in the first to nth capacitors.

4. The driver according to claim 1, wherein the auxiliary capacitor circuit has a switching circuit provided between the input node of the voltage driving circuit and the first to nth auxiliary capacitors.

5. The driver according to claim 4, wherein the switching circuit turns off from an on state before the voltage driving circuit starts voltage driving for outputting the data voltage to the data voltage output terminal.

6. The driver according to claim 5, wherein the voltage driving circuit includes:

an amplifier circuit that outputs the data voltage; and a voltage driving switching circuit provided between output of the amplifier circuit and the data voltage output terminal, wherein the switching circuit of the auxiliary capacitor circuit turns off from an on state before the voltage driving switching circuit turns on from an off state.

7. The driver according to claim 1, wherein the voltage driving circuit is an inverting amplifier circuit.

8. The driver according to claim 7, wherein the auxiliary capacitor driving circuit outputs the first to nth auxiliary capacitor driving voltages corresponding to logically inverted data of the tone data.

9. The driver according to claim 2, further comprising:

a variable capacitance circuit provided between the data voltage output terminal and a reference voltage node, wherein a capacitance of the variable capacitance circuit is set so that a capacitance obtained by adding the capacitance of the variable capacitance circuit and an electro-optical panel-side capacitance is in a prescribed capacitance ratio relationship with a capacitance of the capacitor circuit.

10. An electronic device comprising the driver according to claim 1.

11. An electronic device comprising the driver according to claim 2.

12. An electronic device comprising the driver according to claim 3.

13. An electronic device comprising the driver according to claim 4.

14. An electronic device comprising the driver according to claim 5.

15. An electronic device comprising the driver according to claim 6.

16. An electronic device comprising the driver according to claim 7.

17. An electronic device comprising the driver according to claim 8.

18. An electronic device comprising the driver according to claim 9.

19. The driver according to claim 1, wherein the auxiliary capacitor circuit and the D/A conversion circuit separately output voltages to the input node of the voltage driving circuit, the separately output voltages combining at the input node.

* * * * *